(12) United States Patent
Ong et al.

(10) Patent No.: US 9,082,418 B2
(45) Date of Patent: Jul. 14, 2015

(54) METHODS FOR READING DATA FROM A STORAGE MEDIUM USING A READER AND STORAGE DEVICES

(71) Applicant: MARVELL INTERNATIONAL LTD., Hamilton (BM)

(72) Inventors: Chun Lian Ong, Singapore (SG); Zhimin Yuan, Singapore (SG); Siang Huei Leong, Singapore (SG); Bo Liu, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/943,726

(22) Filed: Jul. 16, 2013

(65) Prior Publication Data
US 2014/0139940 A1 May 22, 2014

Related U.S. Application Data

(60) Provisional application No. 61/671,832, filed on Jul. 16, 2012.

(51) Int. Cl.
| G11B 5/09 | (2006.01) |
| G11B 21/02 | (2006.01) |
| G11B 5/012 | (2006.01) |
| G11B 5/02 | (2006.01) |
| G11B 5/596 | (2006.01) |
| G11B 20/10 | (2006.01) |

(52) U.S. Cl.
CPC ........ *G11B 5/012* (2013.01); *G11B 5/02* (2013.01); *G11B 5/59694* (2013.01); *G11B 20/10009* (2013.01)

(58) Field of Classification Search
None
See application file for complete search history.

(56) References Cited

U.S. PATENT DOCUMENTS

| 7,982,994 B1 | 7/2011 | Erden et al. | |
| 8,599,508 B1 * | 12/2013 | Burd | 360/39 |
| 2011/0181978 A1 | 7/2011 | Rub | |
| 2012/0105994 A1 * | 5/2012 | Bellorado et al. | 360/45 |

OTHER PUBLICATIONS

Search Report and Written Opinion received for Singapore Application No. 201305431-7 dated Sep. 26, 2014, 18 pages.

* cited by examiner

*Primary Examiner* — Regina N Holder

(57) ABSTRACT

According to various embodiments, a method for reading data from a storage medium using a reader may be provided. The method may include: reading a first signal with a reader head of the reader at a first position of the storage medium; reading a second signal with a reader head of the reader at a second position of the storage medium; and determining data stored at a pre-determined position of the storage medium based on the first signal and based on the second signal.

16 Claims, 38 Drawing Sheets

Down Track location
(Phase synchronization):

Cross Track location
(Amplitude ratio)

$$T_2 = X_2 - aT_1$$

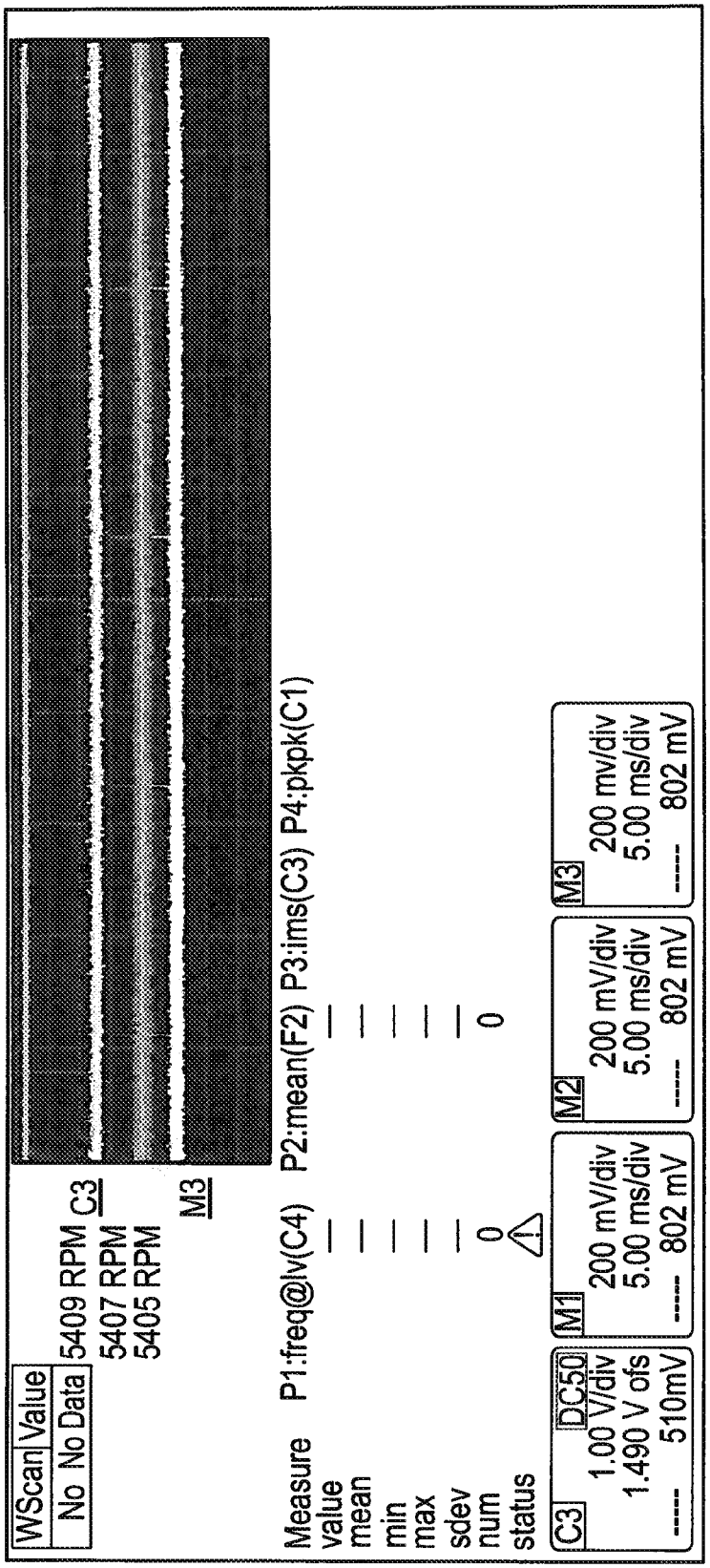
FIG. 23A(1)

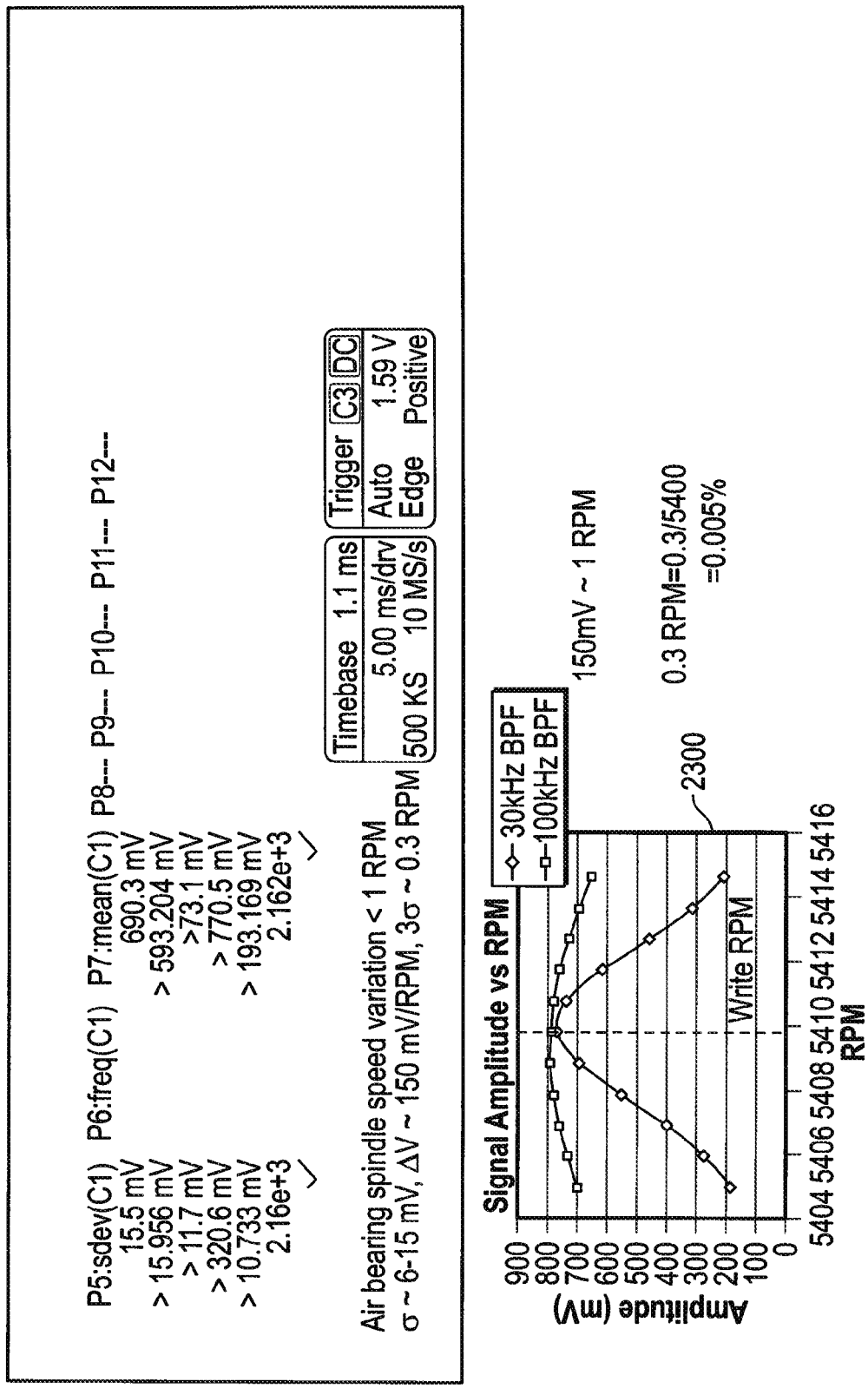
FIG. 23A(2)

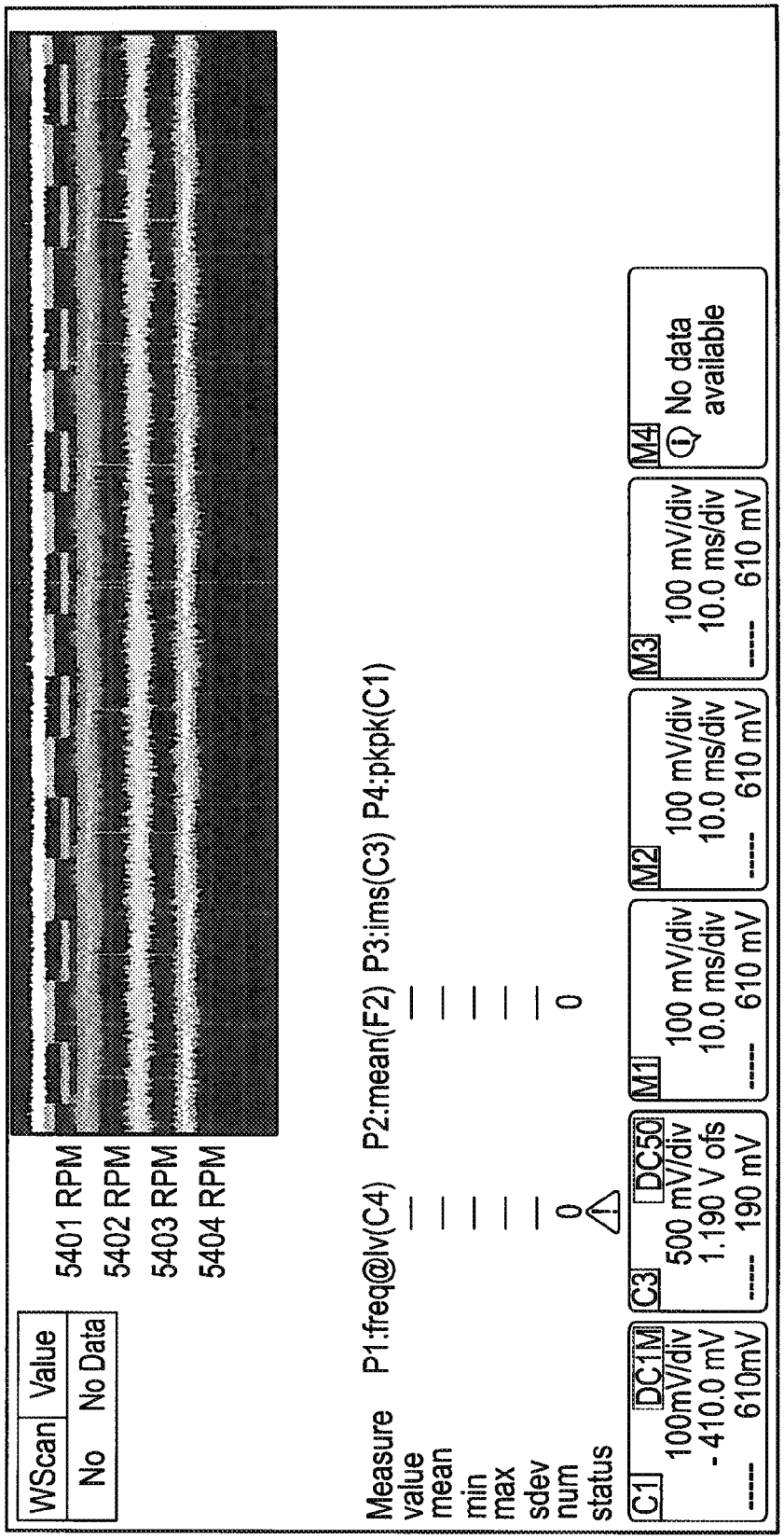
FIG. 23B(1)

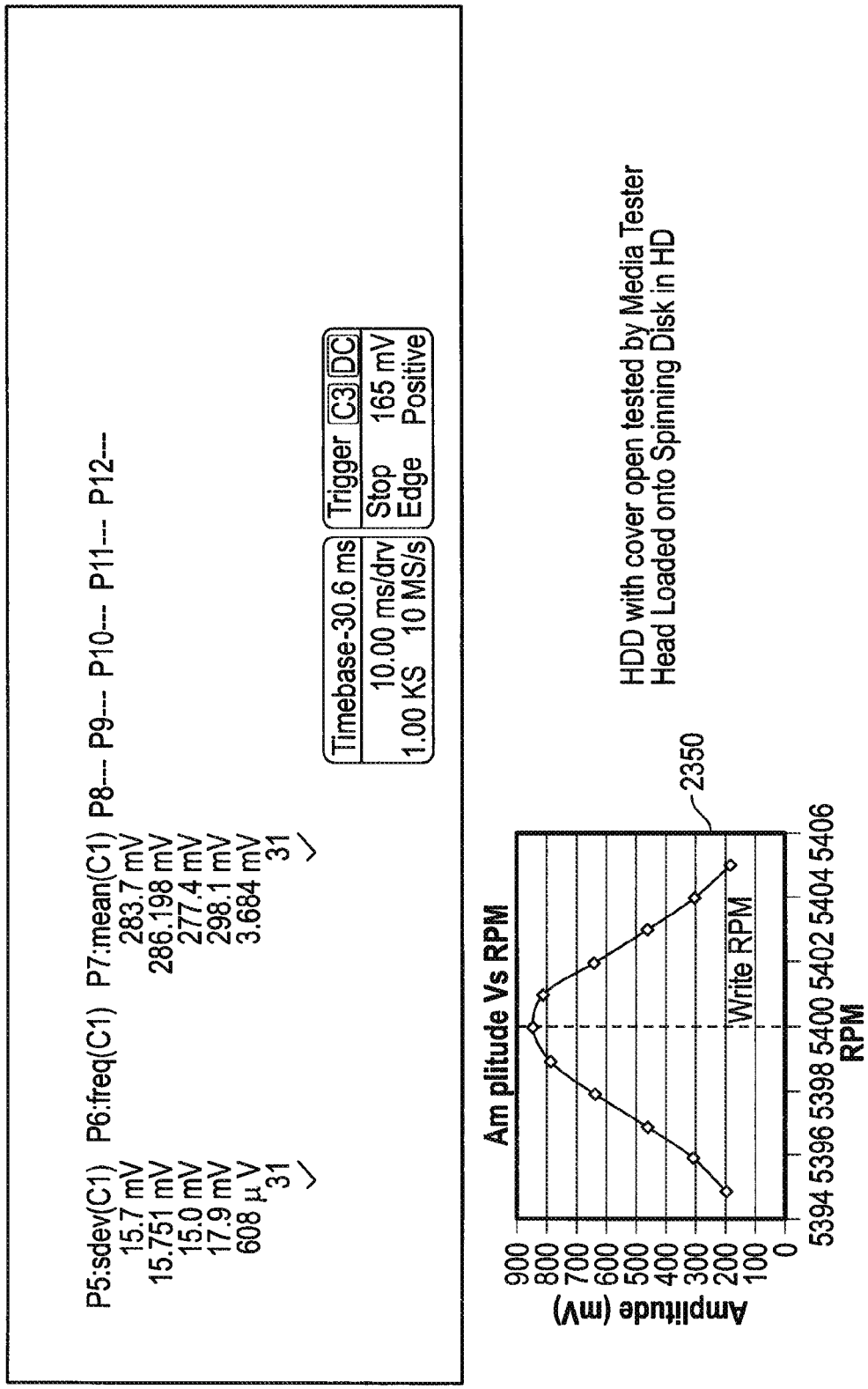
FIG. 23B(2)

FIG 35
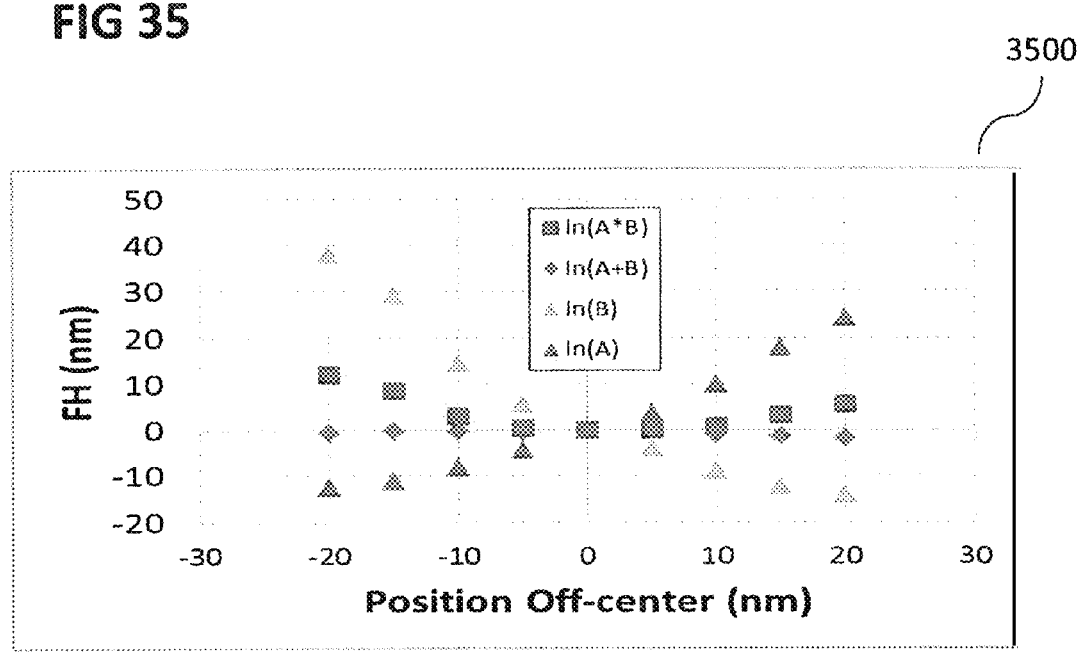
FIG 36A
FIG 36B
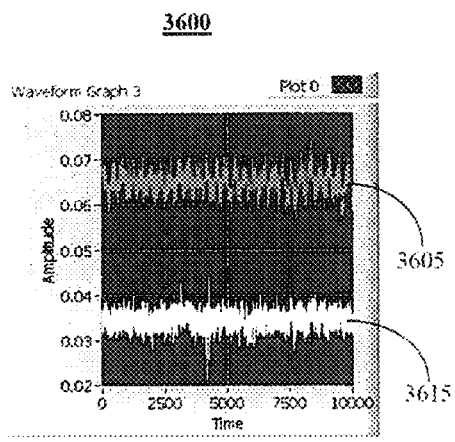
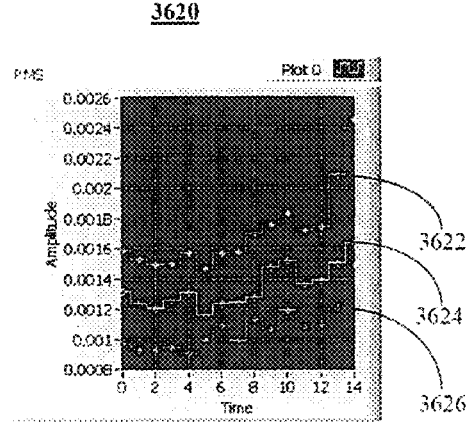

PRIOR ART

METHODS FOR READING DATA FROM A STORAGE MEDIUM USING A READER AND STORAGE DEVICES

CROSS-REFERENCE TO RELATED APPLICATION

The present application claims the benefit of the U.S. provisional patent application No. 61/671,832 filed on Jul. 16, 2012, the entire contents of which are incorporated herein by reference for all purposes.

TECHNICAL FIELD

Embodiments relate generally to methods for reading data from a storage medium using a reader head and to storage devices.

BACKGROUND

The amount of data to be stored on data storage devices is increasing. Thus, it may be desired to provide data storage devices with a high data storage capacity.

SUMMARY

According to various embodiments, a method for reading data from a storage medium using a reader (with one reader head or with a plurality (for example an array) of reader heads, for example multiple readers on a single slider) may be provided. The method may include: reading a first signal with a reader head of the reader at a first position of the storage medium; reading a second signal with a reader head of the reader at a second position of the storage medium; and determining data stored at a pre-determined position of the storage medium based on the first signal and based on the second signal. The reading of the signal can be sequential (for example using a single reader head) or parallel (for example using multiple reader heads in a slider).

According to various embodiments, a storage device may be provided. The storage device may include: a storage medium; a reader (for example including one reader head or multiple reader heads; in other words: a plurality of read heads) configured to read a first signal with a reader head of the reader at a first position of the storage medium and configured to read a second signal with a reader head of the reader at a second position of the storage medium; and a data determination circuit configured to determine data stored at a pre-determined position of the storage medium based on the first signal and based on the second signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 23, comprising FIGS. 23A, 23B, 23C, and 23D, illustrates experimental results from the system of FIG. 20 in accordance with the present invention, wherein FIGS. 23A and 23B show experimental results obtained using the system of FIG. 20 on an air bearing spindle with a measured spindle speed variation and FIGS. 23C and 23D show experimental results obtained using the system of FIG. 20 for measurements on a hard disk drive (HDD) product;

FIG. 27, comprising FIGS. 27A and 27B, illustrates block diagrams of synchronization signal generation and processing for detection of downtrack vibration, spindle speed variation and jitter in accordance with the present embodiment, wherein FIG. 27A depicts a block diagram of the synchronization signal generation and FIG. 27B depicts a block diagram of the synchronization signal processing;

FIG. 34, comprising FIGS. 34A and 34B, illustrates a graph of touchdown curves in accordance with the present embodiment, wherein FIG. 34A depicts a touchdown curve using flying height signals averaged over one hundred measurements and FIG. 34B depicts a touchdown curve using an instantaneous flying height signal measurement;

FIG. 36, comprising FIGS. 36A and 36B, illustrates simulation results of flying height signals under various conditions in accordance with the present embodiment wherein FIG. 36A depicts the flying height signal vibration prior and acoustic emissions (AEs) and FIG. 36B depicts root mean square values of the flying height signal as well as AE sensor signals;

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the storage device as described in this description may include a memory which is for example used in the processing carried out in the storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The amount of data to be stored on data storage devices is increasing. Thus, it may be desired to provide data storage devices with a high data storage capacity.

Reducing the bit aspect ratio (BAR) may be a way to further increase the areal density of HDD (hard disk drives) in the future. Shingled writing with a sharp field gradient may be a promising approach to further reduce the track pitch for higher KTPI (or kTPI, or kilo TPI, wherein TPI may stand for tracks per inch). The reader width may be a determination factor for achievable areal density. With noise limitation and also fabrication tolerance limit, the further reduction of the track width of a reader may be an issue with a big challenge, especially, reducing BAR towards 1. According to various embodiments, devices and methods may be provided to enable reading data from a track pitch which is narrower than its reader size.

According to various embodiments, devices and methods may be provided for shingle reading with a wide reader.

Figure 1A:
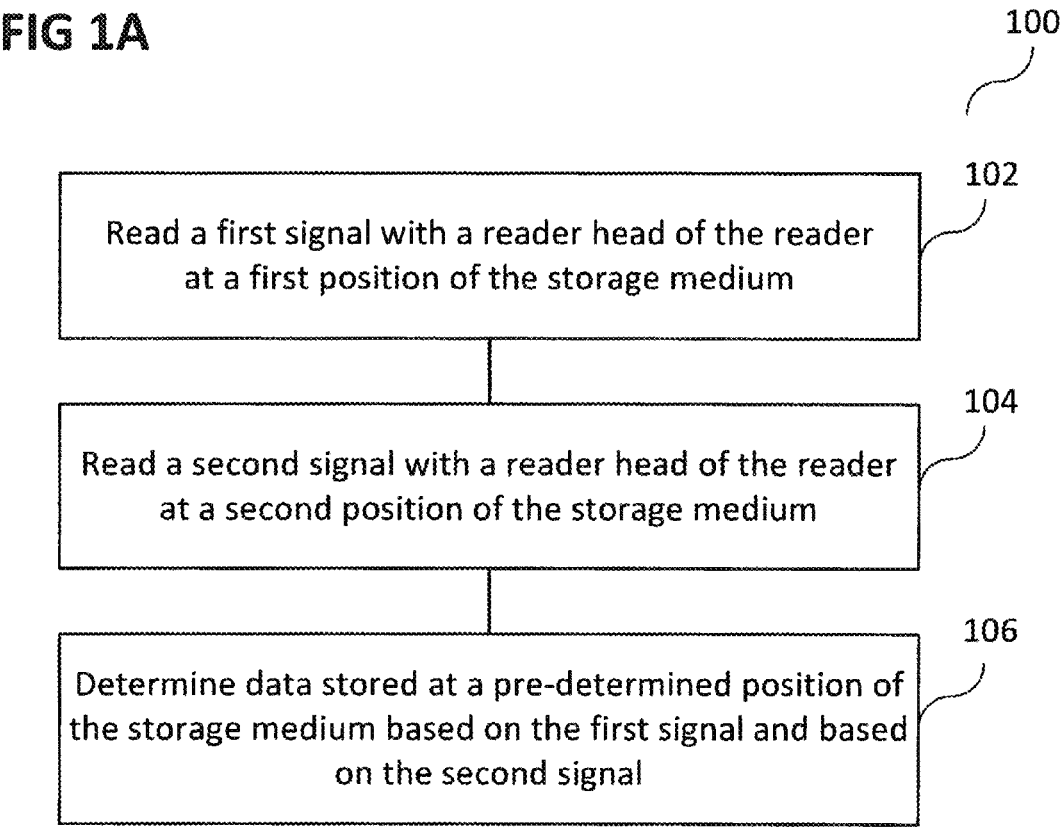
FIG. 1A shows a flow diagram illustrating a method for reading data from a storage medium using a reader (with one reader header or with a plurality of reader heads) in accordance with an embodiment.

FIG. 1A shows a flow diagram 100 illustrating a method for reading data from a storage medium using a reader in accordance with an embodiment. The reader may include for example with one reader head or a plurality of reader heads, for example multiple readers on a single slider. In 102, a first signal may be read with a reader head of the reader at a first position of the storage medium. In 104, a second signal may be read with a reader head (for example the same reader head used for reading a the first position of the storage medium, or another reader head of the reader) at a second position of the storage medium. In 106, data stored at a pre-determined position of the storage medium may be determined based on the first signal and based on the second signal. The same procedure can be achieved by using multiple readers head to pick up multiple location signals at one read process. The multiple read heads may have a fixed reader offset in both down track and cross track. This may provide a simple way for reconstructing the narrower track information from wide reader.

In other words, in a method according to various embodiments, a plurality of readings may be made, wherein a reader head may be at different positions for each of the plurality of readings (for example at a first position for the first reading, at a second position for the second reading, and so on). Then, based on the plurality of readings, data that is stored on one pre-determined position of the storage medium may be determined based on the plurality of readings. The plurality of readings can be based on multiple read heads. According to various embodiments, in a single reader head (in other words: in a reader with only one reader head) signals may be read sequentially in a plurality reads. In a multiple readers head (in other words: in a head with a plurality of reader heads) signals may be read parallel in a plurality (parallel or simultaneous) reads. Multiple readers head mean many that there is provided a plurality of reader sensors in one head. Each reader may pick up a signal at different location simultaneously.

According to various embodiments, it may be understood that the reader head at a position may be understood as the center of the reader head on (or above) the position of the storage medium.

The storage medium may for example be a magnetic storage medium, for example a hard disc drive.

According to various embodiments, the storage medium may include a plurality of tracks. Each track may have a width (or a pitch) smaller than a width of a reader head of the reader.

According to various embodiments, for at least one of the first position or the second position a reader head of the reader may cover a first track and a second track.

According to various embodiments, the pre-determined position may include or may be one of a pre-determined position on the first track or a pre-determined position on the second track.

According to various embodiments, the first track and the second track may be adjacent.

According to various embodiments, the method may further include: reading a plurality of signals. For each signal, a reader head of the reader may be at a different position of the storage medium. The method may further include determining data stored at the pre-determined position of the storage medium based on the plurality of signals. For example a multiple readers head may be used to pick up multiple signals at different location.

According to various embodiments, the method may further include: determining the data stored at the pre-determined position of the storage medium based on a de-convolution.

According to various embodiments, the method may further include: reading a frequency burst signal with a reader head of the reader at a position of the storage medium, wherein the position includes a frequency burst provided before a data track on the storage medium. According to various embodiments, the method may further include determining the data stored at the pre-determined position of the storage medium may further be based on the frequency burst signal.

According to various embodiments, the storage medium may include a plurality of tracks having a width (or a pitch) smaller than a width of a reader head of the reader; and the storage medium may include at least one track having a width (or a pitch) equal to or larger than the width of the reader head.

According to various embodiments, the first position may be different from the second position.

According to various embodiments, determining of the data stored at a pre-determined position of the storage medium may further be based on determining an amplitude coefficient, the amplitude coefficient indicating a contribution of data stored at the first position of the recording medium.

According to various embodiments, determining of the data stored at a pre-determined position of the storage medium may further be based on determining an amplitude coefficient, the amplitude coefficient indicating a contribution of data stored at the second position of the recording medium.

According to various embodiments, determining of the data stored at a pre-determined position of the storage medium may further be based on determining a phase offset of data stored at the first position of the recording medium.

According to various embodiments, determining of the data stored at a pre-determined position of the storage medium may further be based on determining a phase offset of data stored at the second position of the recording medium.

Figure 1B:
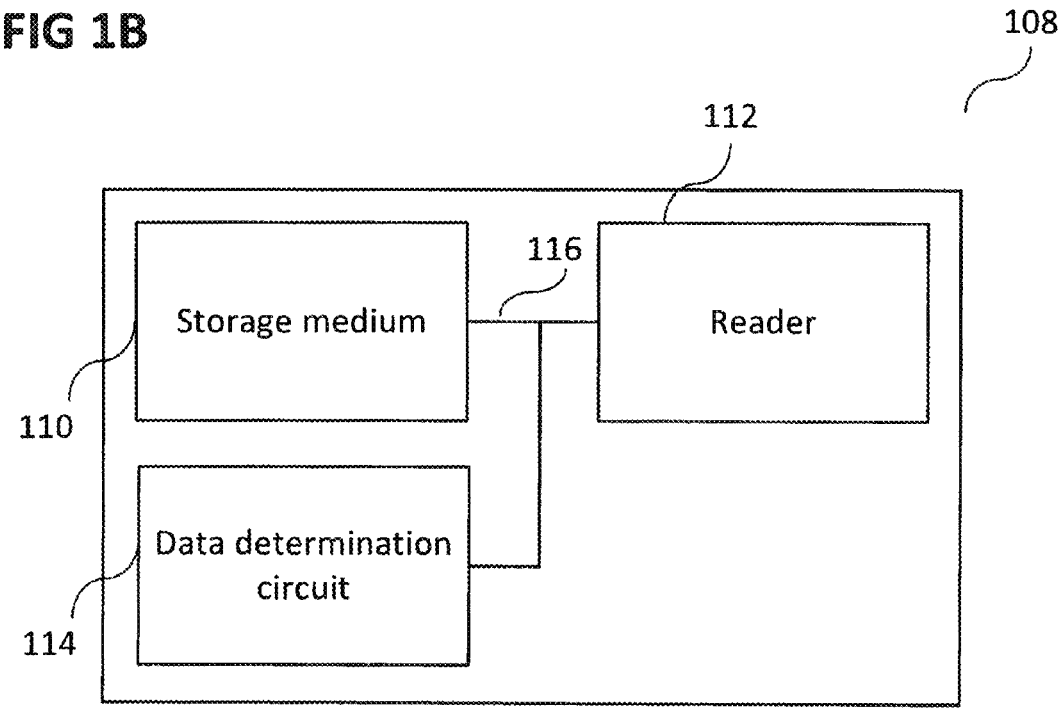
FIG. 1B shows a storage device in accordance with an embodiment.

FIG. 1B shows a storage device 108 in accordance with an embodiment. The storage device 108 may include a storage medium 110. The storage device 108 may further include a reader 112 (for example including one reader head or a plurality of reader heads) configured to read a first signal with a reader head of the reader at a first position of the storage medium and configured to read a second signal with a reader head (for example the same reader head used for reading a the first position of the storage medium, or another reader head of the reader) at a second position of the storage medium. The storage device 108 may further include a data determination circuit 114 configured to determine data stored at a pre-determined position of the storage medium based on the first signal and based on the second signal. The storage medium 110, the reader 112, and the data determination circuit 114 may be coupled with each other, like indicated by lines 116, for example electrically coupled, for example using a line or a cable, and/or mechanically coupled.

According to various embodiments, it may be understood that the reader head at a position may be understood as the center of the reader head on (or above) the position of the storage medium.

The storage medium may for example be a magnetic storage medium, for example a hard disc drive.

According to various embodiments, the storage medium 110 may include a plurality of tracks, each track having a width (or a pitch) smaller than a width of a reader head of the reader.

According to various embodiments, for at least one of the first position or the second position a reader head of the reader may cover a first track and a second track.

According to various embodiments, the pre-determined position may include or may be one of a pre-determined position on the first track or a pre-determined position on the second track.

According to various embodiments, the first track and the second track may be adjacent.

According to various embodiments, the reader 112 may further be configured to read a plurality of signals. For each signal, a reader head of the reader 112 (for example the same reader head (for example the single reader head of the reader) or different reader heads of the reader) may be at a different position of the storage medium 110. The determination circuit 114 may further be configured to determine data stored at the pre-determined position of the storage medium 110 based on the plurality of signals.

According to various embodiments, the determination circuit 114 may further be configured to determine the data stored at the pre-determined position of the storage medium 110 based on a de-convolution.

According to various embodiments, the reader 112 may further be configured to read a frequency burst signal with a reader head of the reader 112 (for example the same reader head (for example the single reader head of the reader) or different reader heads of the reader) at a position of the storage medium including a frequency burst provided before a data track on the storage medium 110. The determination circuit may further be configured to determine the data stored at the pre-determined position of the storage medium further based on the frequency burst signal.

According to various embodiments, the storage medium 110 may include a plurality of tracks having a width (or a pitch) smaller than a width of a reader head of the reader 112. The storage medium 110 may or may not include at least one track having a width (or a pitch) equal to or larger than the width of the reader head 112.

According to various embodiments, the first position may be different from the second position.

According to various embodiments, the determination circuit 114 may further be configured to determine the data stored at a pre-determined position of the storage medium further based on determining an amplitude coefficient, the amplitude coefficient indicating a contribution of data stored at the first position of the recording medium.

According to various embodiments, the determination circuit 114 may further be configured to determine the data stored at a pre-determined position of the storage medium further based on determining an amplitude coefficient, the amplitude coefficient indicating a contribution of data stored at the second position of the recording medium.

According to various embodiments, the determination circuit 114 may further be configured to determine the data stored at a pre-determined position of the storage medium further based on determining a phase offset of data stored at the first position of the recording medium.

According to various embodiments, the determination circuit 114 may further be configured to determine the data stored at a pre-determined position of the storage medium further based on determining a phase offset of data stored at the second position of the recording medium.

A shingled magnetic recording (SMR) zone may include a plurality of shingled or overlapping tracks. For instance, a first track may be overlapped by a second track immediately adjacent (i.e. contiguous) to the first track and the second track may be overlapped by a third track immediately adjacent (i.e. contiguous) to the second track. The width of a writing element may be larger than the track pitch (i.e. the non-overlapped portions of the width of a data track).

According to various embodiments, a de-convolution method may be provided to enable a larger reader to read data from track pitch which is narrower than its reader size. Simulation results and experimental data will be described below to demonstrate the feasibility of the various embodiments. Furthermore, according to various embodiments, a subsequent suitable shingle writing scheme and an implementation of correlation ratio by using a dedicated frequency burst before a data track may be provided, like will be described in more detail below.

Figure 2:
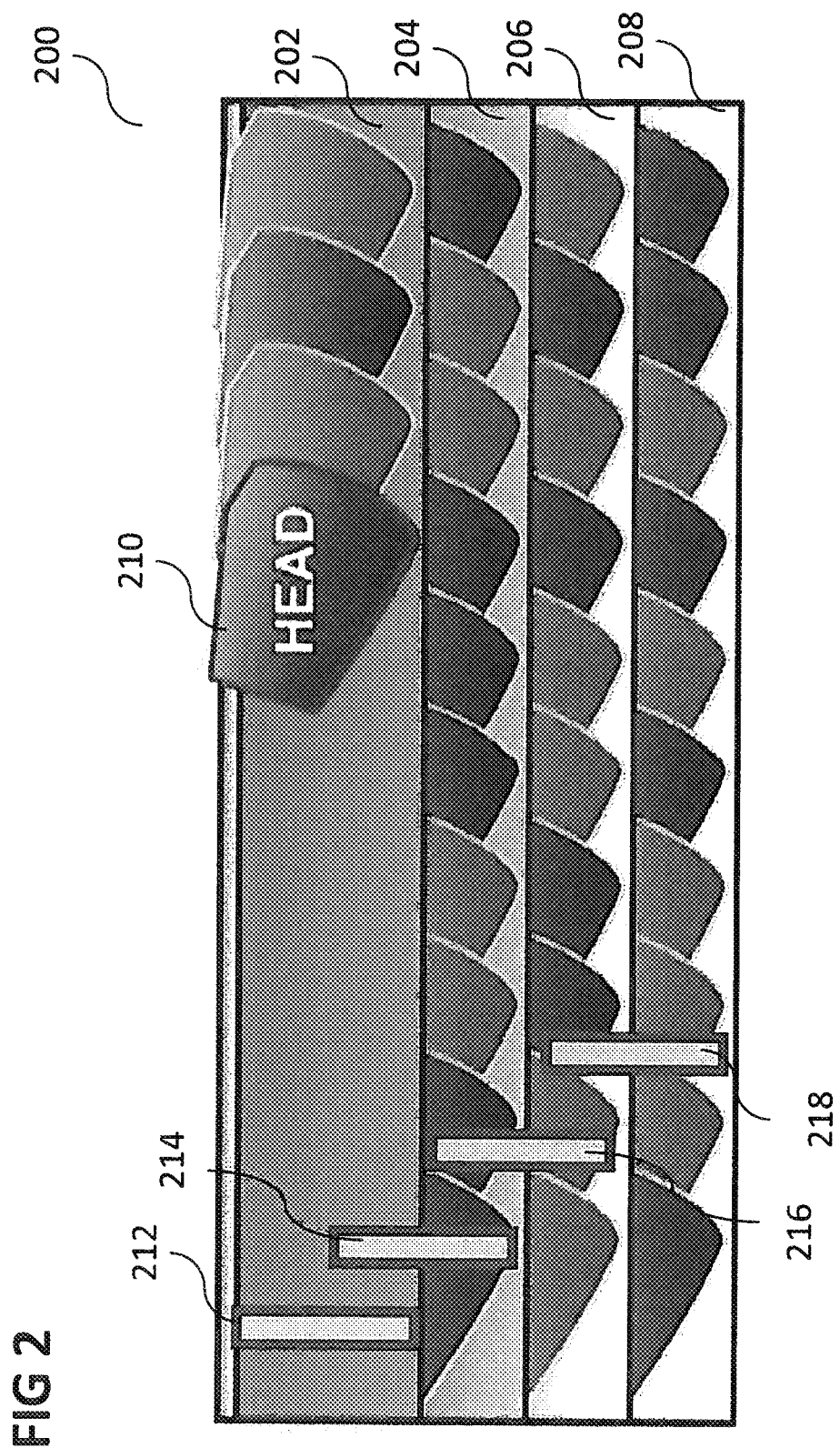
FIG. 2 shows a schematic illustration of a wide reader for shingled tracks on a recording medium in accordance with an embodiment.

FIG. 2 shows a schematic illustration 200 of a reader for shingled tracks on a recording medium. In the shingled magnetic recording, a shingled track (for example a first shingled track 204, a second shingled track 206, and a third shingled track 208) may be designed to be narrower than the reader width (for example as indicated by an exemplary size of reader head 210) as shown in FIG. 2. It will be understood that although three shingled tracks 204, 206, and 208 are shown in FIG. 2, any number of shingled tracks may be provided. At the last track of shingled zone, the track 202 may be wider than the reader (or reader head) such that the reader may reproduce the integrity single track signal. This signal may be called the reference track signal. When the reader moves to the shingled tracks, the reader covers 2 tracks in one reading. Subsequently, the reader picks up a number of tracks of data or a page of data. According to various embodiments, a de-convolution process may be applied to get the data back (in other words: to determine the data stored in the recording medium).

For example, at a first position 212, the reader may read a first signal from the wide track 202 only. The first signal may correspond to the data stored in the wide track 202. At a second position 214, the reader may read a second signal which may be a combination or a mixture of signals from (or stored in) the wide track 202 and from (or stored in) the first shingled track 204. By knowing the signal from the wide track 202, the data stored in the first shingled track 204 may be reconstructed. At a third position 216, the reader may read a third signal which may be a combination or a mixture of signals from (or stored in) the first shingled track 204 and from (or stored in) the second shingled track 206. By knowing the signal from the first shingled track 202, the data stored in the second shingled track 206 may be reconstructed. At a fourth position 218, the reader may read a fourth signal which may be a combination or a mixture of signals from (or stored in) the second shingled track 206 and from (or stored in) the third shingled track 208. By knowing the signal from the second shingled track 204, the data stored in the third shingled track 208 may be reconstructed.

A de-convolution method can be either using a fixed-offset adjacent track subtraction method or amplitude coefficient estimation method to reconstruct the shingle track information.

Figure 3:
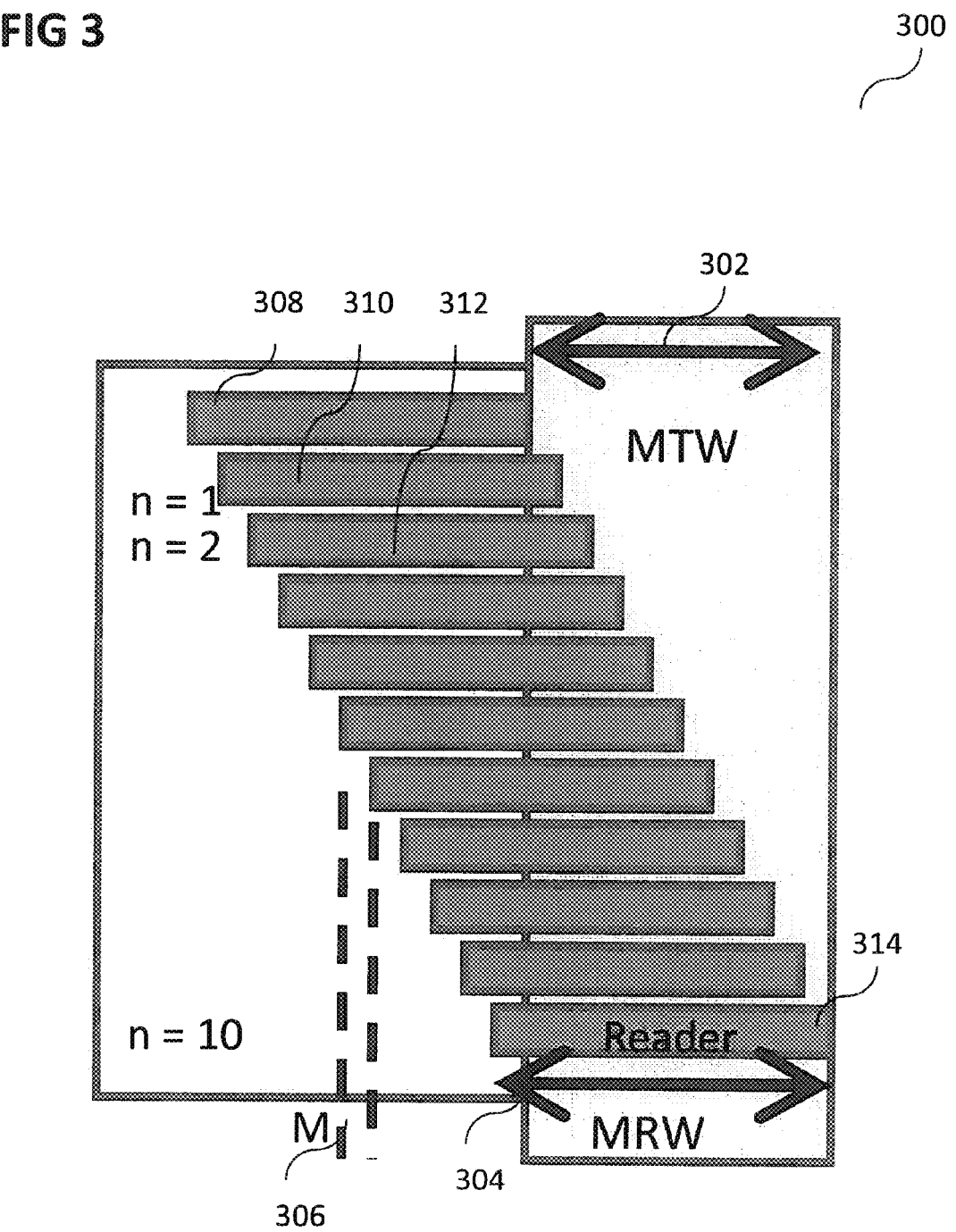
FIG. 3 shows an illustration of a de-convolution method for a fixed-offset adjacent track subtraction method in accordance with an embodiment.

FIG. 3 illustrates an example of a read back process of a de-convolution method. For example, a fixed-offset adjacent track subtraction method may be shown. If the magnetic reader width (MRW 304, or short "reader width" or "read width"), which for example may be measured in nm, is defined to be larger than the Magnetic shingle Track width (MTW 302, or short "track width"), which for example may be measured in nm, the equation of the read back signal $X_n$ at location n may be $$X_n = A_n T_1 + B_n T_2 = \frac{MRW - nM}{MRW} T_1 + \frac{nM}{MRW} T_2 \quad (1)$$

where A may be the ratio of the amplitude signal contributed by a first data track, for example the data track $T_1$, and B may be the ratio of the amplitude signal contributed by a second data track, for example the data track $T_2$, wherein M 306 may be a step size (which may for example be measured in nm), n may be a step index, nM may be an offset (for example measured in nm) from the adjacent read, nM may be smaller than or equal MTW 302 (in other words: nM≤MTW), and A+B=1 (for example to normalize against MRW 304). For this example scheme, the MRW 304 may be larger than MTW 302 (of the second track T2). But MRW 304 may be smaller than the MTW of T1 (of the first track). The first MTW may be larger than MRW to provide a good signal without adjacent track interference for the subsequent track data recovery. Furthermore, it will be understood that $X_n$ corresponds to an n step offset from an initial position.

In the following, a fixed-offset adjacent track subtraction method according to various embodiments will be described.

According to various embodiments, a method may be provided which takes the subtraction of two adjacent tracks read back signal with a known read offset. Generic equations derived from equation (1) may be shown as below:

$$X_n - X_{n-1} = -\frac{M}{MRW}T_1 + \frac{M}{MRW}T_2 \quad (2)$$

$$X_n - X_0 = -\frac{nM}{MRW}T_1 + \frac{nM}{MRW}T_2 \quad (3)$$

It will be understood that the equations (2) and (3) may be derived from equation (1). The only different of them may be the step size or read offset.

Equation (2) illustrates the results of direct subtraction of 2 adjacent track with a known read offset between the signal. Equation (3) shows a special case where $X_0$ in equation may be referring to the signal only solely is contributed by the wide track $T_1$. Equations (2) and (3) may have a unique characteristic whereby the coefficient of $T_1$ and $T_2$ may be equal. The coefficient is defined as ratio of read offset to MRW. Substituting the known $T_1$ from reference track, $X_0$, $T_2$ may be reconstructed.

A simulation may be carried out to demonstrate the devices and methods according to various embodiments.

Figure 4:
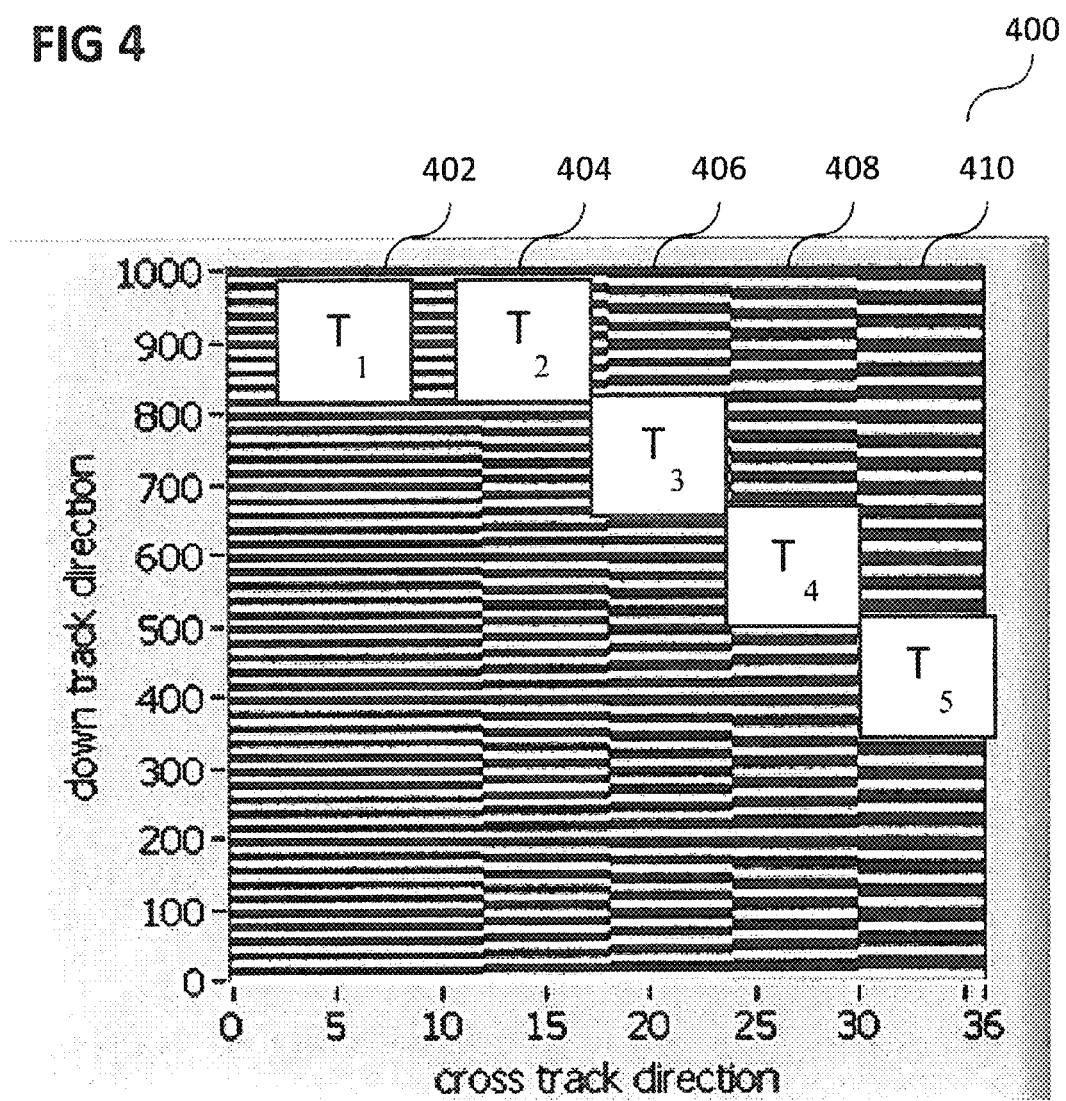
FIG. 4 shows a diagram of simulated shingle write pattern in accordance with an embodiment.

FIG. 4 shows an illustration 400 of a simulated shingle writing scheme which includes 5 data track, $T_1$ to $T_5$ (for example $T_1$ (402), $T_2$ (404), $T_3$ (406), $T_4$ (408), and $T_5$ (410)).

$T_1$ may be the last shingle writing zone (which may also be referred to as the reference track) where the MTW may be set to be 12 units (arbitrary unit length) whereas the track width of the other tracks may be set to be 6 units. In this simulation, the MRW may be assumed to be same size as reference track width, 12 units.

Figure 5:
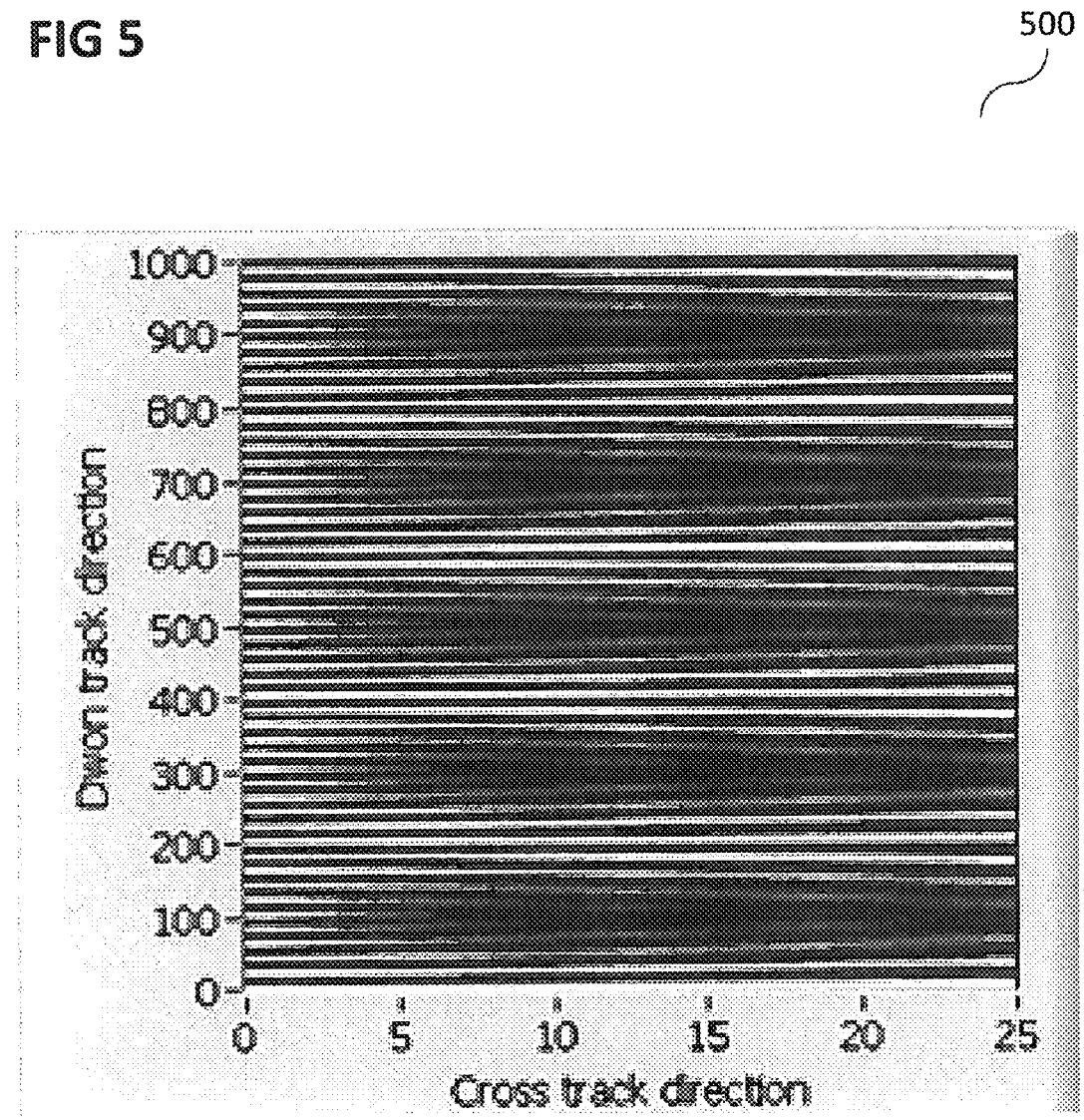
FIG. 5 shows a simulated read back from a reader which is wider than the track pitch in accordance with an embodiment.
Figure 6:
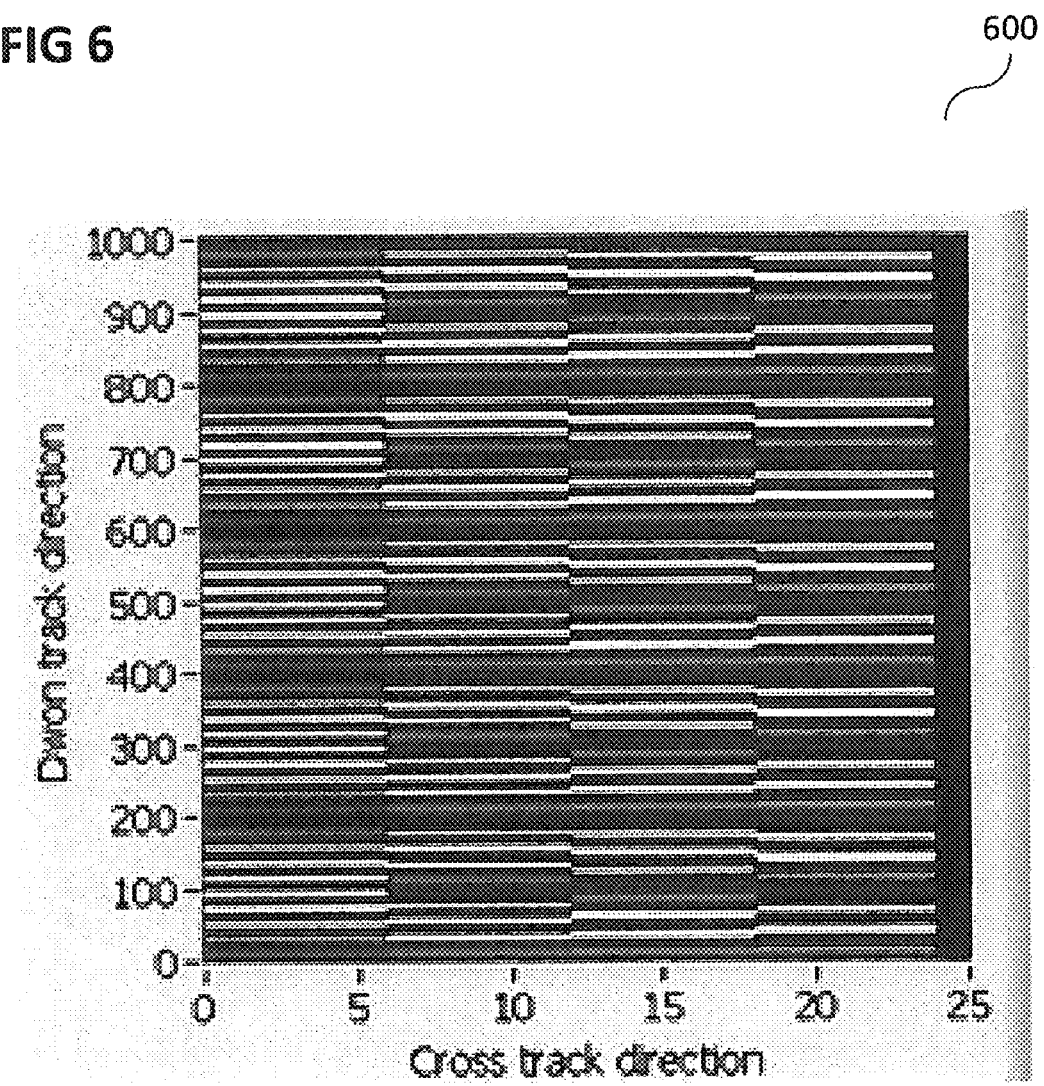
FIG. 6 shows an illustration of signal processing of a fixed-offset adjacent track subtraction method on simulated signal in accordance with an embodiment.
Figure 7:
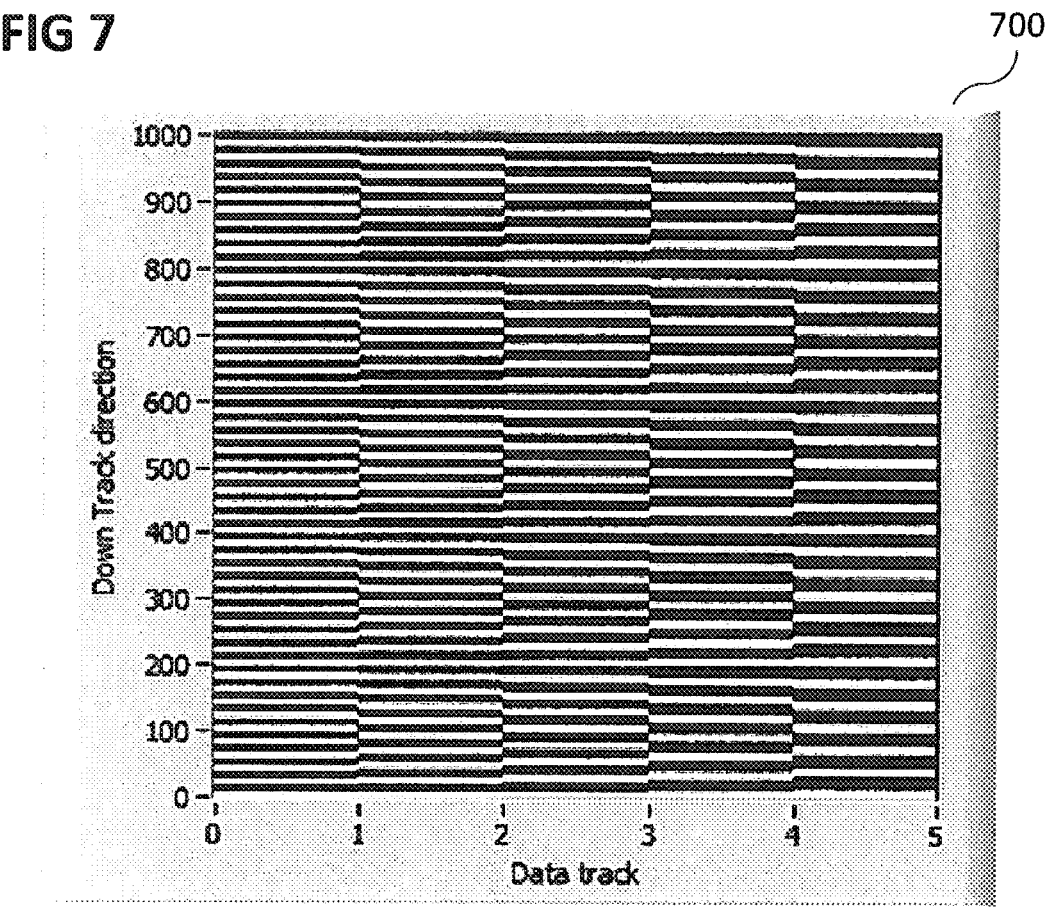
FIG. 7 shows an illustration of recovered simulated written signal in accordance with an embodiment.

FIG. 5 shows an illustration 500 of a mapping of the reader's read back signal $X_n$ by moving 1 unit/step using equation 1. The resultant $X_n$ is later subtracted by $X_{n-1}$ (equation 2 and 3) as described in the fixed-offset adjacent track subtraction method. FIG. 6 shows the resultant processed signal of fixed-offset adjacent track subtraction method as in the illustration 600. Subsequently $T_2$ to $T_5$ signal may be reconstructed as shown in illustration 700 of FIG. 7. by solving the equation.

In the following, deconvolution by amplitude coefficient estimation method according to various embodiments will be described. For example, $X_n = AT_1 + BT_2$; and the fixed offset adjacent track method according to various embodiments as described above does not need to know what is component A and B. By subtracting $X_n$ to $X_{n-1}$, it may be solved for the $T_1$ and $T_2$. In the amplitude coefficient estimation method according to various embodiments, a method to estimate A and B may be used in order to solve or reconstruct the T1 and T2. According to various embodiments, the fixed offset adjacent track method may use a multiple reader configuration.

Figure 8:
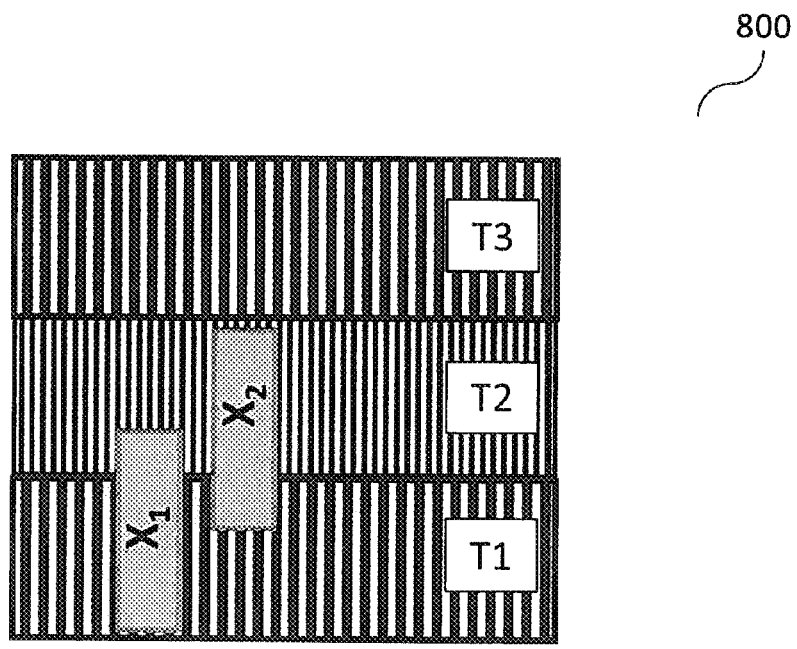
FIG. 8 shows an illustration of a read back signal $X_1$ and $X_2$ over 2 shingle tracks in accordance with an embodiment.

FIG. 8 shows the illustration 800 of a read back signal $X_1$ and $X_2$ over 2 shingle tracks $T_1$ and $T_2$:

$$X_1 = aT_1 + bT_2$$

$$X_2 = cT_1 + dT_2 \quad (4)$$

Equation (4) can be solved to reconstruct $T_1$ and $T_2$ if coefficient a, b, c and d are accurately estimated. Equation 5 shows the reconstructed shingle track $T_1$ and $T_2$.

$$T_1 = \frac{X_1 - bT_2}{a} \quad (5)$$

$$T_2 = \frac{X_2}{c\left(\frac{X_1 - b}{a}\right) + d}$$

Figure 9:
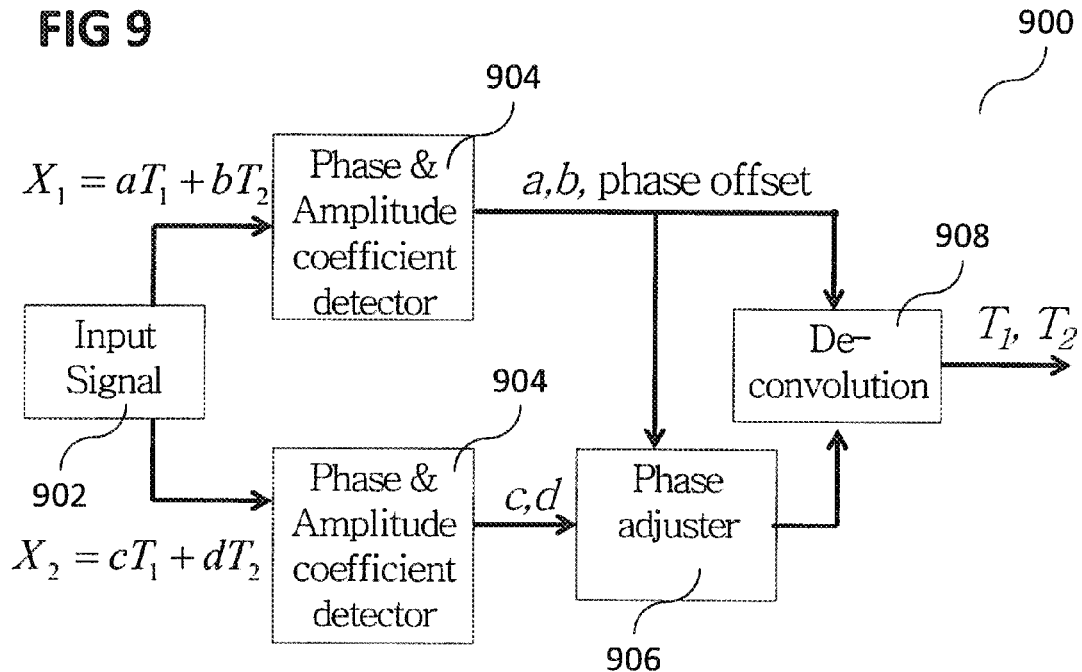
FIG. 9 shows an illustration of a general schematic diagram of deconvolution based on amplitude coefficient estimation method in accordance with an embodiment.

FIG. 9 shows an illustration 900 of general schematic of de-convolution method using the amplitude coefficient estimation method according to various embodiments. For illustration purpose, the scheme shows only 2 read back signals 902 (for example $X_1$ and $X_2$) to describe the working principle. According to various embodiments, the numbers of read back signals may not be limited. The 2 input signal may be sequentially read by a single reader head (sequential plurality read) or parallel read by multiple reader head (parallel plurality read). In real HDD application, signal $X_1$ and $X_2$ may be subjected to down track jitter noise and cross track positioning jitter (amplitude coefficient). A de-convolution process may require that both signals are phase synchronized in down track direction and track positioning jitter needs to be captured in the track amplitude coefficient a, b, c and d. The individual read back signal may go through a phase detector and amplitude coefficient detector 904 to estimate phase offset and a, b, c, d value. The phase offset of $X_2$ may be adjusted by a phase adjuster 906 according to $X_1$ to produce synchronized signal. $T_1$ and $T_2$ may be reconstructed (for example by de-convolution 908 following the de-convolution process as described in equation (5)).

Figure 10:
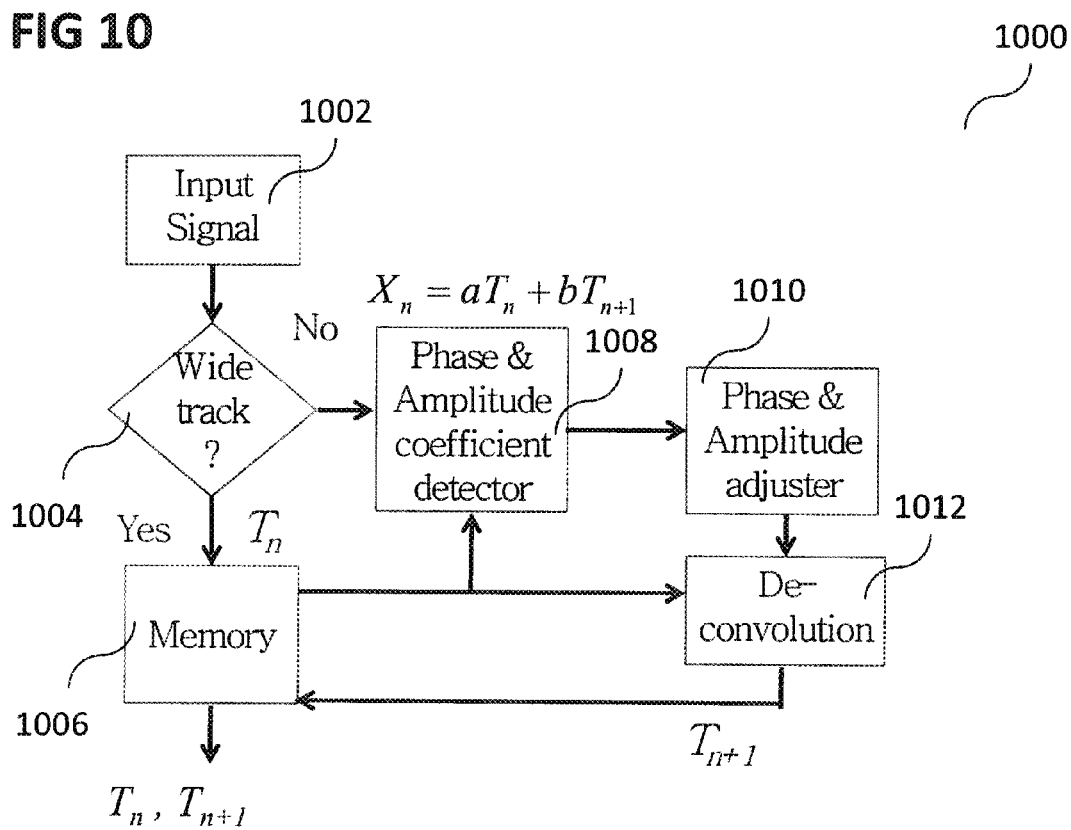
FIG. 10 shows an illustration of a schematic diagram of deconvolution based on amplitude coefficient estimation method in sequential plurality reading in accordance with an embodiment.

In sequential plurality reading, a de-convolution scheme may utilize the benefits of inherent wide track of shingle write as shown in illustration 1000 of FIG. 10. If the input signal 1002 is from wide track (as determined in 1004), the read back signal X may directly be store in a memory 1006 as data track $T_1$. Subsequently, a read back signal $X_n$ from shingle track may go through a phase detector and amplitude coefficient detector 1008 to determine phase offset of $X_n$ with respect to $T_n$ from memory and estimate the amplitude coefficient, a and b. Output of the detector will go through a phase and amplitude adjuster 1010 to produce synchronized signal before deconvoluting (in 1012) to reconstruct track info of $T_{n+1}$. The scheme will continue to use $T_{n+1}$ to reconstruct the next track signal.

There may be many ways to determine the phase offset and amplitude coefficient. Various embodiments will be described. Most of the following description is based on the scheme illustrated in FIG. 10. but the principle illustrated may also be applied in scheme illustrated in FIG. 9.

Figure 11:
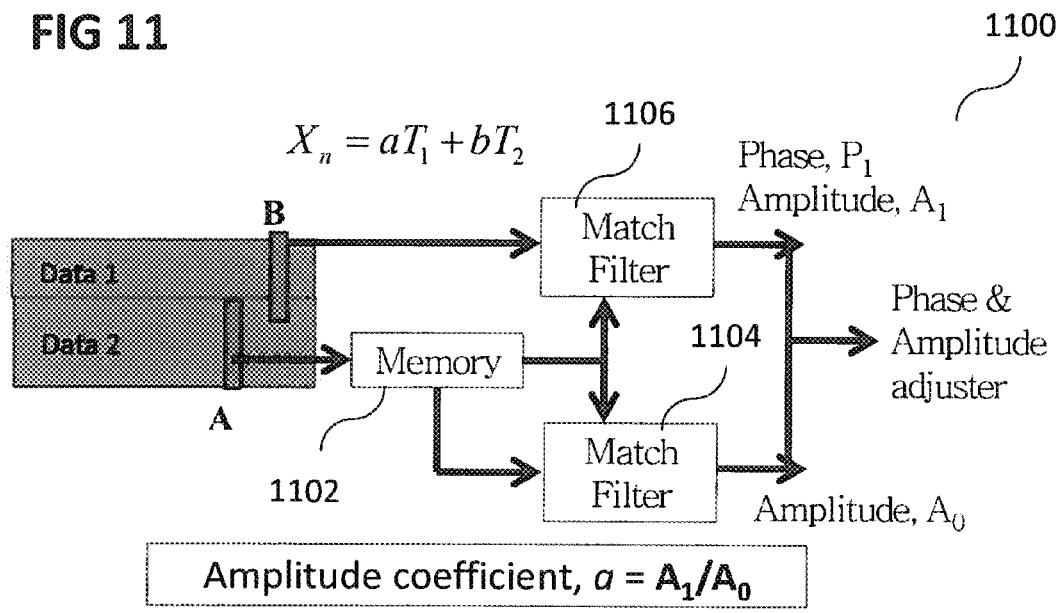
FIG. 11 shows an illustration of a first phase and amplitude coefficient detector scheme implementing a cross-correlation method or matching filter method.

FIG. 11 shows a phase and amplitude detector scheme 1100 using cross-correlation method or matching filter method to recover the signal. The reference signal $X_1$ in memory 1102 may first cross-correlate (or match) itself using a match filter 1104 to produce a reference amplitude, $A_0$. Subsequence shingle read signal $X_2$ may match with the reference signal $X_1$ (for example using a further match filter 1106) to produce the phase difference $P_1$ and amplitude $A_1$. The amplitude coefficient, α may be a normalization of amplitude $A_1$ with respect to $A_0$. After the phase and amplitude adjuster, the shingle track data may be reconstructed.

Figure 12:
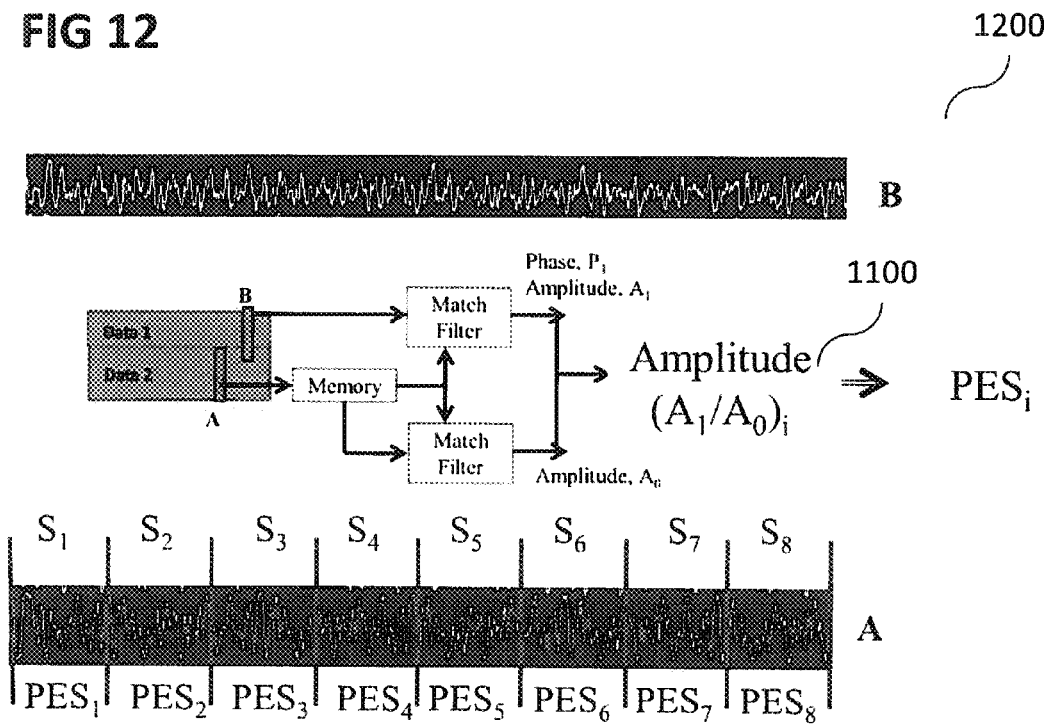
FIG. 12 shows an illustration of an extraction of continuous PES signals out from high sampling amplitude coefficient.
Figure 13:
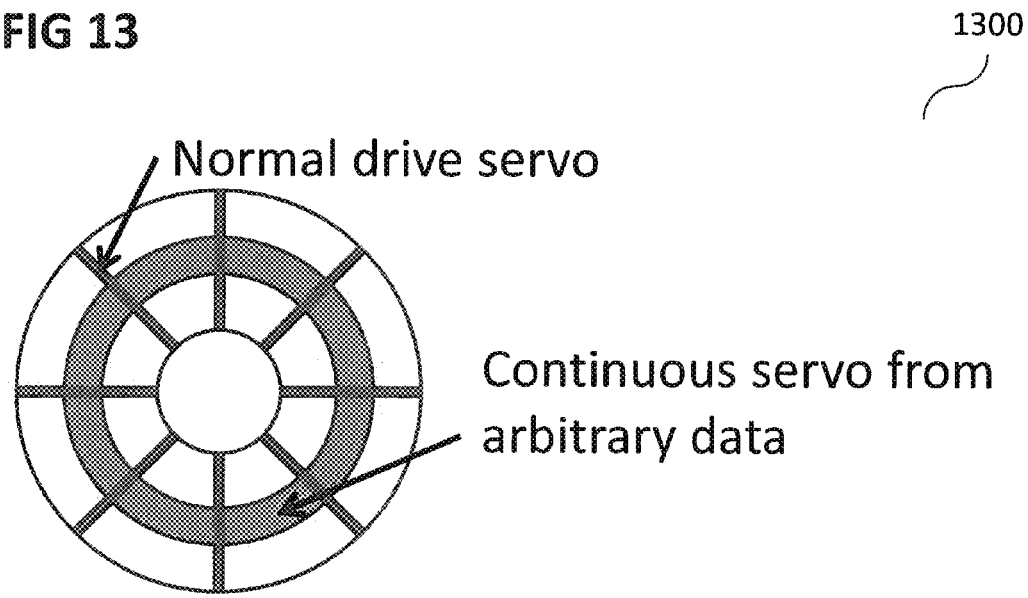
FIG. 13 shows a dual stage PES Servo configuration.

The matching filter scheme may have additional benefits. If we divide the reference data and shingle data into smaller section as shown in illustration 1200 of FIG. 12, a higher sampling of amplitude coefficient $a_i([A_1/A_0]_i)$ may be obtained. The amplitude coefficient may translate into the position error signal (PES). Thus, a continuous PES system may be extracted from the arbitrary data pattern in the shingle reading system. A dual stage PES servo control system 1300 in FIG. 13 may then be provided. During the wide track read back, the continuous servo from arbitrary data pattern may not available. The conventional drive servo may be applied as the wide track requires less TPI (tracks per inch) resolution. When the head is reading the narrow track, it may need high TPI capability and the matched filter may generate precise PES continuously or higher bandwidth servo control.

Besides, higher sampling rate of amplitude coefficient $\alpha_i = (A_1/A_0)_i$, the devices and method according to various embodiments may have ability to compensate the PES error during the recovery of shingle track signal and hence may make the system more tolerate to PES error and relax the need of high bandwidth servo control system. Combination of high PES bandwidth and high sampling rate of amplitude coefficient may make the system more robust in shingle read system.

Figure 14:
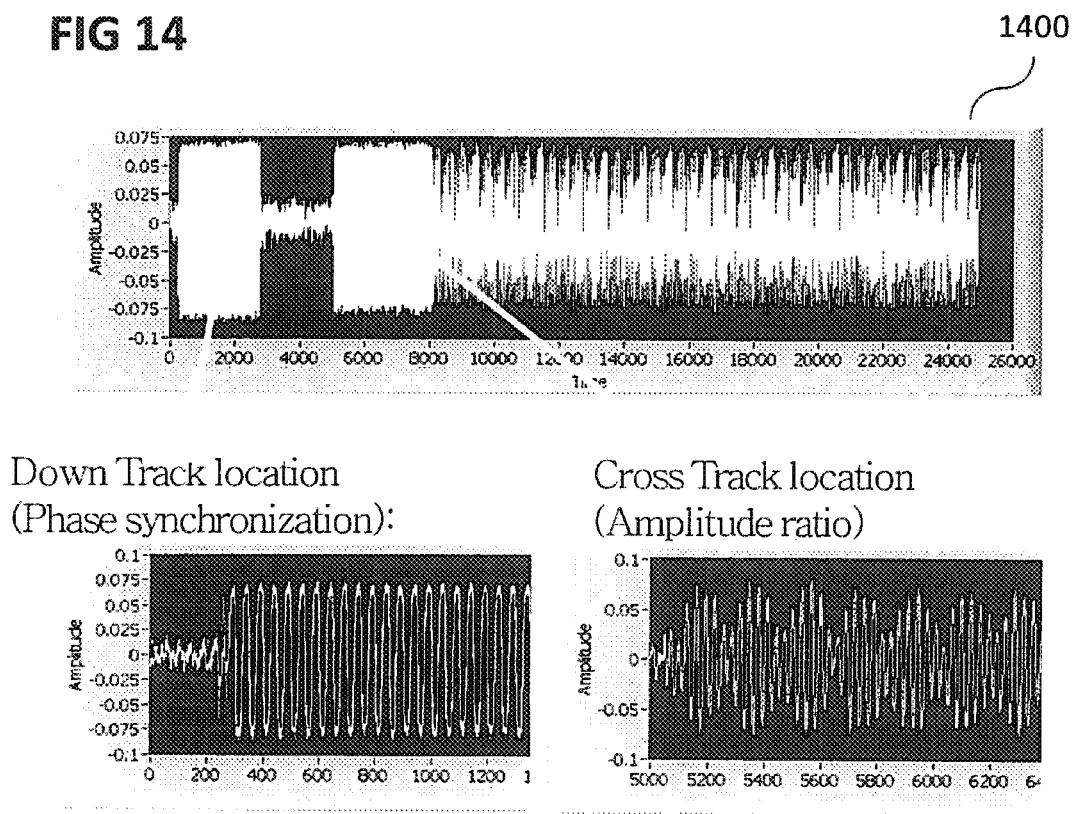
FIG. 14 shows a second phase and amplitude coefficient scheme including a preamble as phase synchronization and introducing an additional multi-frequency data pattern in data region for amplitude coefficient detection.
Figure 15:
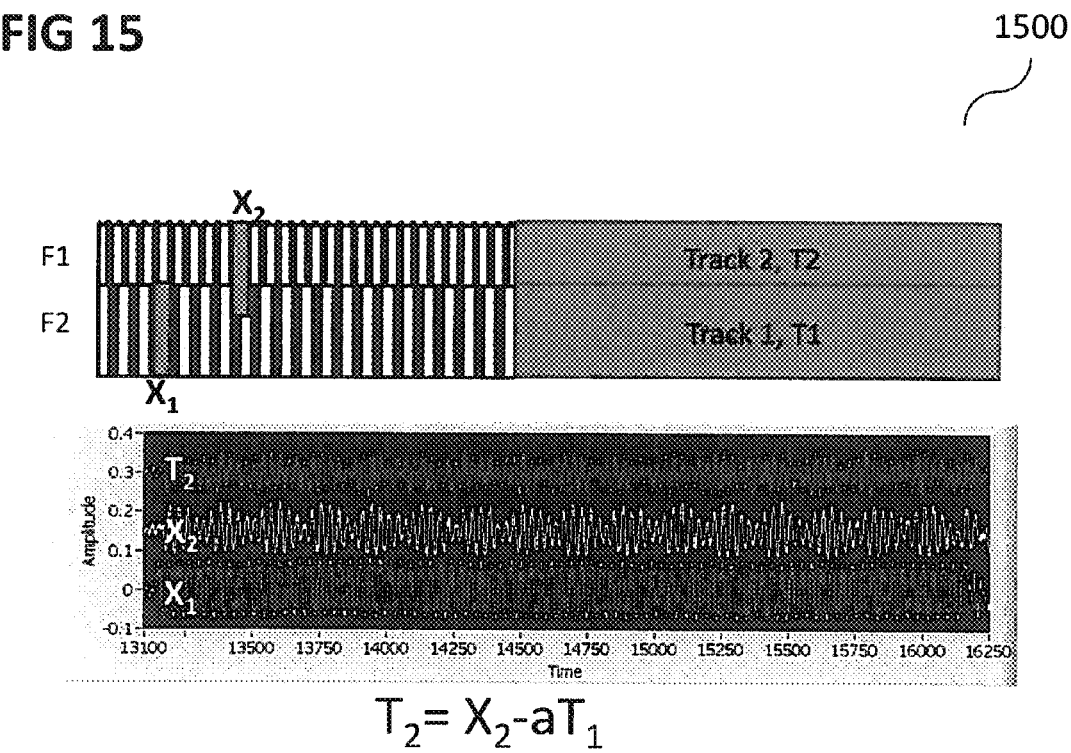
FIG. 15 shows a diagram and a signal associated to the second scheme.

FIG. 14 shows another phase and amplitude detector scheme 1400. It uses conventional drive servo preamble to achieve phase synchronization and uses additional multi-frequency data pattern to determine the amplitude contribution factor of reference track in shingle read track. FIG. 15 shows an illustration 1500 wherein the additional single frequency data pattern is written at the beginning of data sector or at the end of data sector. The adjacent shingle track may write a different frequency for differentiation. Hence a multi-frequency data pattern is formed across the shingle track. In the shingle read track, the amplitude coefficient, a, b, c, d may be estimated through the different frequency burst. In 2 frequency system, the first method to estimate a value may be through iteration. Base on FIG. 15, the signal $X_1$ is the wide track frequency burst, while signal $X_2$ is the shingle read track dual frequency signal. By iterating "a" value during subtraction of $X_2$ to $X_1$, until the maximum SNR of shingle track $T_2$ (frequency burst region) is achieved. This condition achieved when the T1 signal is at minimum in frequency signal. At the beginning of each data track, a frequency burst may be written. For example, a first track $T_1$ may have a first frequency $F_1$ and a second track $T_2$ may have a second frequency $F_2$. When the head read is at the position in between the 2 tracks (this may be a second read, while we have the first read at $T_1$ wide track), it may follow the equation shown in FIG. 5 ($T_2 = X_2 - aX_1$). At each iteration of subtracting $X_2$ from $X_1$ ($X_1 = T_1$), the "a" value may be adjusted until the resultant $T_2$ signal has least component of $T_1$ signal. This may be reflected in SNR as we the FFT (fast Fourier transform) of $F_2$ may be compared against $F_1$ signal. Another method to estimate amplitude coefficient may be through the amplitude detection of frequency burst. The value may become:

$$a = \frac{A_{F1} - A_{F2}}{A_{F1} + A_{F2}} \quad (6)$$

Figure 16:
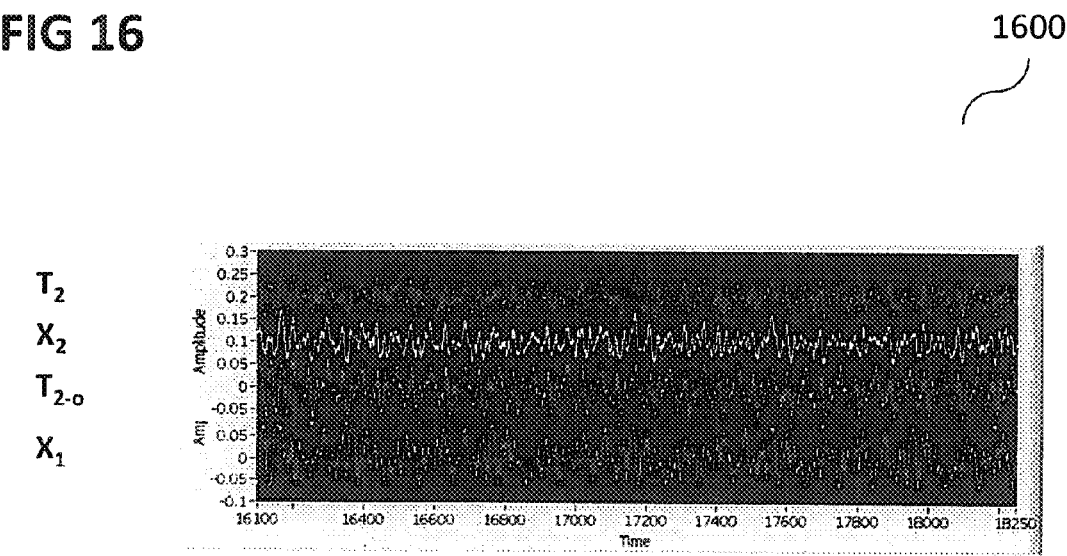
FIG. 16 shows a signal comparison between original track signal and reconstructed track signal.
Figure 16:
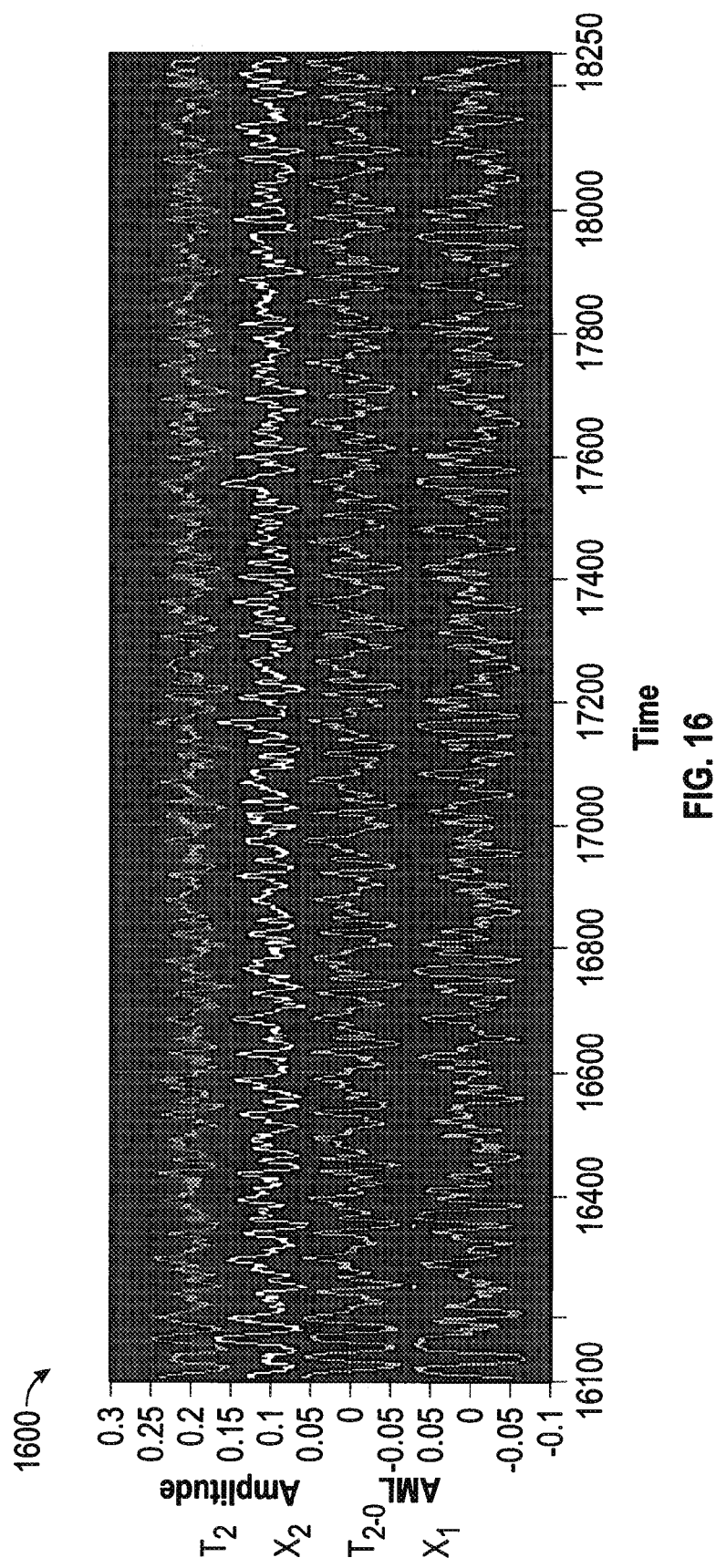
Figure 17:
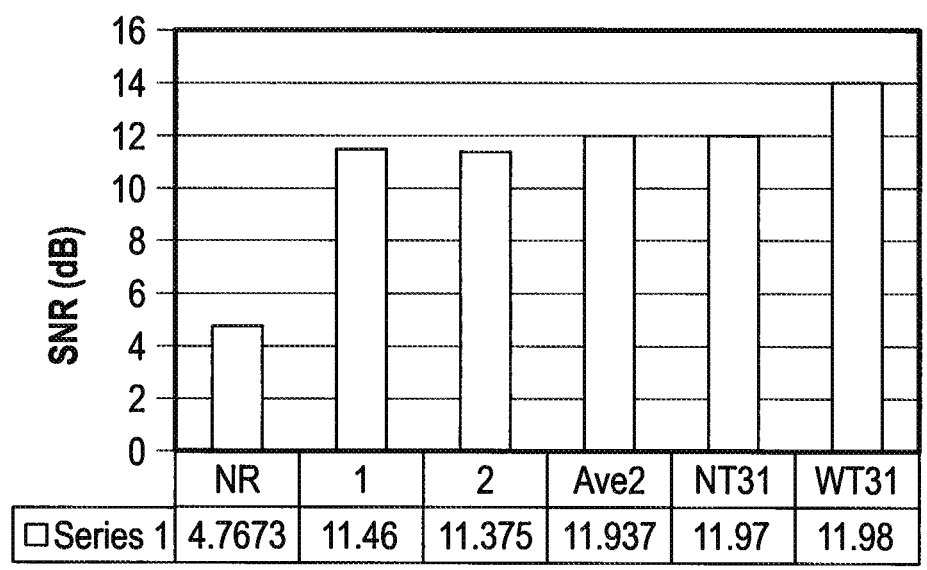
FIG. 17 shows a SNR comparison for the case NR (No signal recovery apply), 1 and 2 (shingle track signal recovered using the scheme 2), NT31 (original shingle track with no adjacent interference) and WT31 (wide track signal)
Figure 17:
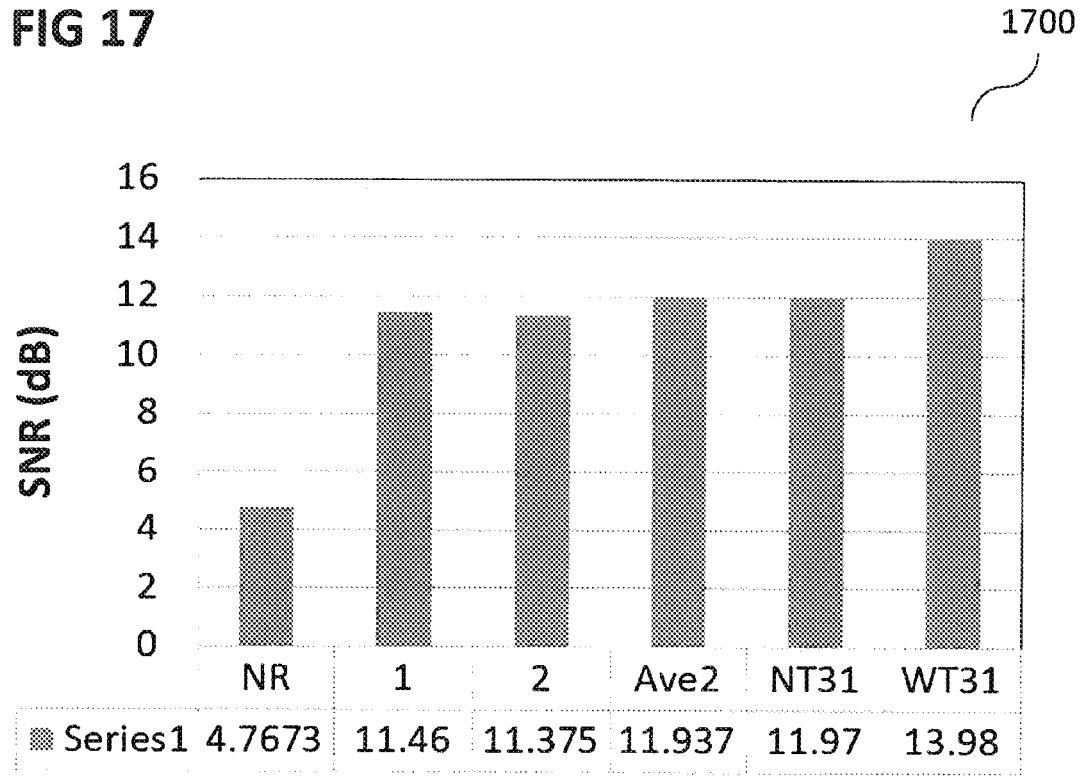

FIGS. 16 and 17 showing the de-convolution results from the "a" iteration method. FIG. 16 show the signal image comparison 1600 between wide track data $X_1$, shingle read track $X_2$, original shingle track data $T_{2-o}$, and recover shingle data $T_2$. The reconstructed shingle track $T_2$ look alike as original shingle track $T_{2-o}$. In FIG. 17, a chart 1700 shows that without signal recovery, the shingle read track SNR is 4.76 dB compared to the original shingle track NT31 at 11.97 dB. The wide track signal WT31 may have relatively larger SNR compared to the NT31 as the wide reader will pick up the media noise outside of the narrow track. The reconstructed signals (1 or 2) may have SNR relatively close to the NT31. It shows that the de-convolution scheme according to various embodiments may reproduce a signal of a shingle track.

Figure 18:
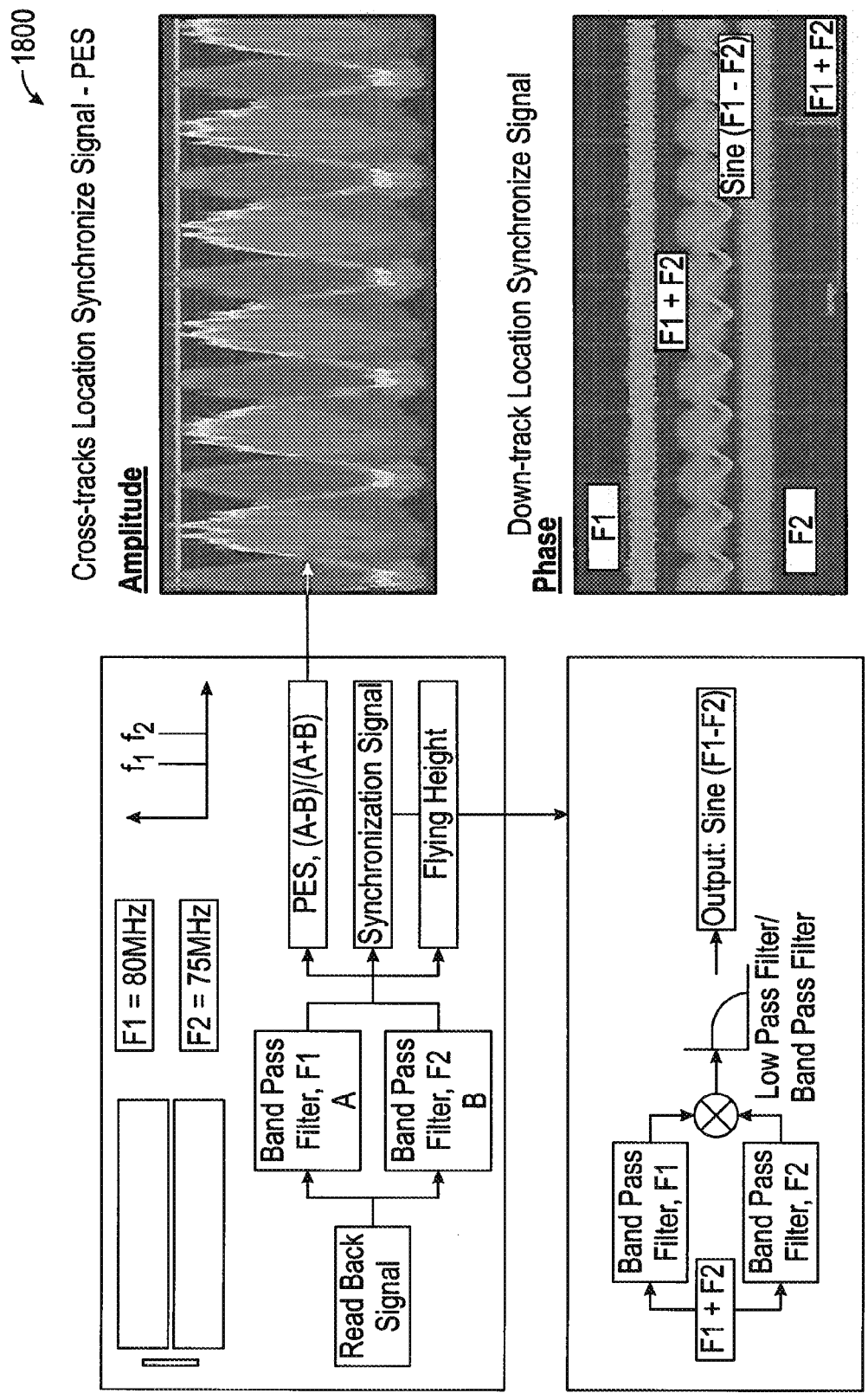
FIG. 18 shows a third phase and amplitude coefficient detection scheme wherein a buried layer dedicated servo can generate both PES and phase synchronization signal for wide reader magnetic recording.

For the third phase and amplitude coefficient detector scheme, a buried layer dedicated servo system, like will be described in more detail below, may be used to realize the wide reader shingle magnetic recording system. FIG. 18 shows the example 1800 of dedicated multi-frequency servo which may generate both continuous PES and phase synchronization signal. If two frequencies burst F1 and F2 are written in the dedicated servo layer below the data layer, and the reader is position to cover 2 servo track, the read back signal can generate the PES signal by detecting the amplitude of the frequency burst as shown in equation (7).

$$PES = \frac{A_{F1} - A_{F2}}{A_{F1} + A_{F2}} \quad (7)$$

It may be a similar concept to equation (6) in determining the amplitude coefficient of reference track. The mixing frequency F1 and F2 together with the low pass filter may generate an output sine wave with frequency F1−F2. This signal may be used as phase synchronization signal. Besides, phase offset can be detected through the preamble signal as described above.

Figure 19:
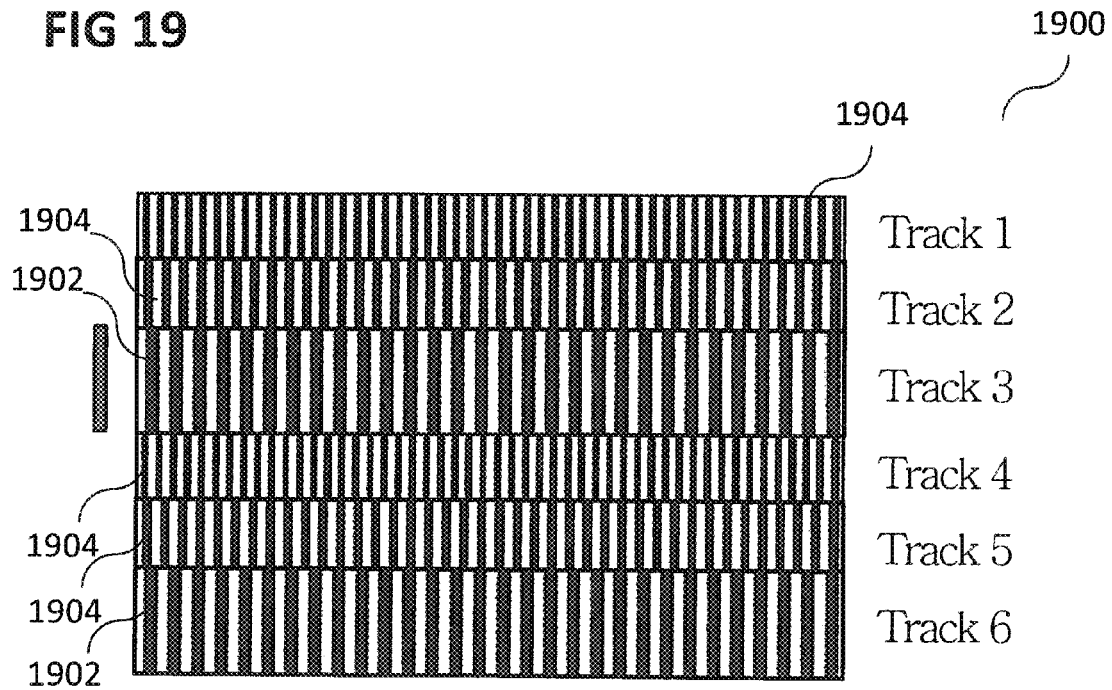
FIG. 19 shows an illustration of a writing scheme for wide reader in shingle magnetic recording in accordance with an embodiment.

The deconvolution scheme shows in FIG. 9 is to have a wide track as the reference track in a data zone. However, in reading process, it may need to have start reading from the wide track to retrieve the data. It may increase the reading time if only a few data track is needed out of the whole data zone. Hence, a suitable shingle writing scheme 1900 shown in FIG. 19 can be applied to reduce the reading time by increasing the number of wide tracks 1902 in the data zone. For example, at each n shingle narrow write track 1904, a wide track (MTW≥MRW) may be written as the reference signal. This wide track 1902 may serve as the reference track to recover the both sides of narrow shingle read track. This may avoid the need to read the whole data zone if only a small portion of data is need. Besides, this writing scheme may have advantages by limiting the number of narrow shingle track to be recovered with reference to the wide track. For example, the scheme showed in FIG. 19 indicates that at every 2 narrow shingle tracks will have a wide track. Since each wide track may be the reference for both adjacent narrow shingle tracks, the scheme may provide a certain quality of SNR to be maintained in the shingle reading scheme. It may benefit especially to the case where the subsequent narrow recovered track may inherence some signal deterioration. If the signal becomes the next reference track for the next shingle reading track recovery, the error may accumulate and SNR may worsen.

In the following, a buried layer dedicated servo system (for example relating to methods and apparatus for hard-disk drive system operation monitoring and self-adjustment) according to various embodiments will be described.

The following generally relates to data storage devices, and more particularly relates to hard disk drive (HDD) data storage products, including methods and apparatus for monitoring and adjusting the operation thereof.

Hard disk drives include a recordable medium and a head which is mounted to move above the recordable medium as the medium spins. As hard disk drives are designed to smaller and smaller sizes and the medium is designed to store more and more information on narrower and narrower tracks, it is imperative that the relative positions of the rotating medium and the moving head be monitored and other parameters such as relative motion and speed variations be monitored. Such monitoring is needed in order to correct any errors before they become too great. However, today's monitoring techniques are insufficient for the track widths, height tolerances and other parameters.

Thus, what is needed are robust monitoring and self-adjustment techniques for hard disk drives that are compatible with future ultra-thin, greater storage hard disk drives. Furthermore, other desirable features and characteristics will become apparent from the subsequent detailed description, taken in conjunction with the accompanying drawings and this background of the disclosure.

According to the Detailed Description, a method for monitoring hard disk drive operation in a hard disk drive system is provided. The hard disk drive system includes a spindle, a disk and a head. The method includes the steps of writing a wide pattern having a predetermined frequency on a track of a hard disk drive medium, generating a readback signal by reading the wide pattern from the track, processing the readback signal by mixing the readback signal with a reference signal to obtain a summed signal and a difference signal, and filtering the summed signal by a filter centered around the difference signal to generate a measurement signal corresponding to a relative speed change of the spindle and a head-to-disk motion.

In accordance with another aspect of the present embodiment, a method for monitoring operation of a hard disk drive system is presented. The hard disk drive system includes a disk medium including a buried servo layer having a first frequency of data on a first track and a second frequency of data on a second track, the second track adjacent to the first track. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal to generate a synchronization signal comprising downtrack information. The downtrack information may include spindle speed variation, spindle speed jitter, and relative head-disk vibration in the downtrack direction.

In accordance with yet another aspect of the present invention, a method for measuring flying height of a head over a disk medium in a hard disk drive (HDD) system is provided. The HDD system includes a disk medium having a buried servo layer with a first frequency of data on a first track and a second frequency of data on a second track, the second track adjacent to the first track. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal using Wallace equations to generate a synchronization signal comprising flying height information. A further aspect includes developing a table of operational parameters for various pressures and temperatures from the flying height information for improved HDD system operation.

The following detailed description is merely exemplary in nature and is not intended to limit the invention or the application and uses of the invention. Furthermore, there is no intention to be bound by any theory presented in the preceding background of the invention or the following detailed description of the invention. In this detailed description, three embodiments will be discussed: a novel and improved technique for relative head-disk motion and spindle speed variation measurement, a novel and improved technique for downtrack synchronization in a dedicated servo based magnetic recording system, and a novel and improved technique for flying height monitoring in dedicated servo based magnetic recording system.

A new embodiment is presented to measure, in addition to spindle speed variation, the relative head-disk downtrack motion. Unlike conventional approaches such as approaches using hall sensors and rotary encoders or approaches using back electromagnetic field (EMF) measurement for determining spindle speed, the present embodiment uses written-in information on a disk to provide continuous and real-time information about relative head-disk motion, including the effects of relative head-disk vibration. In addition, the present embodiment does not require additional components in a hard disk drive (HDD) implementation except firmware implementation of the present embodiment and a frequency source to be provided by the HDD system on chip (SOC) circuitry.

Current measurement techniques for spindle speed are typically implemented via rotary encoders (optical), hall sensors or measurement of back EMF. For a hard disk drive (HDD) which uses brushless DC (BLDC) motors and performs spindle speed measurement, such measurement can be accomplished through Hall sensors built into the motor. In addition it is also possible, depending on the driving circuitry, to measure spindle speed from back EMF.

However, all these methods provide only information on the rotational speed of the spindle and, therefore, are unable to provide the actual relative head-disk speed or motion which is affected by other effects such as head-disk vibrations. In addition, the need to further increase recording density means that current and future HDDs will move towards very few grains/bit recording. This puts added stress on the ability to write accurately on the magnetic bits. The need for accurate and synchronized writing means that spindle speed variation, jitter and undesired relative head-disk motion and vibration need to be kept very small. At the same time, the ability to accurately measure and quantify such spindle speed variation, jitter and undesired relative head-disk motion and vibration at high resolution becomes very important.

Figure 20:
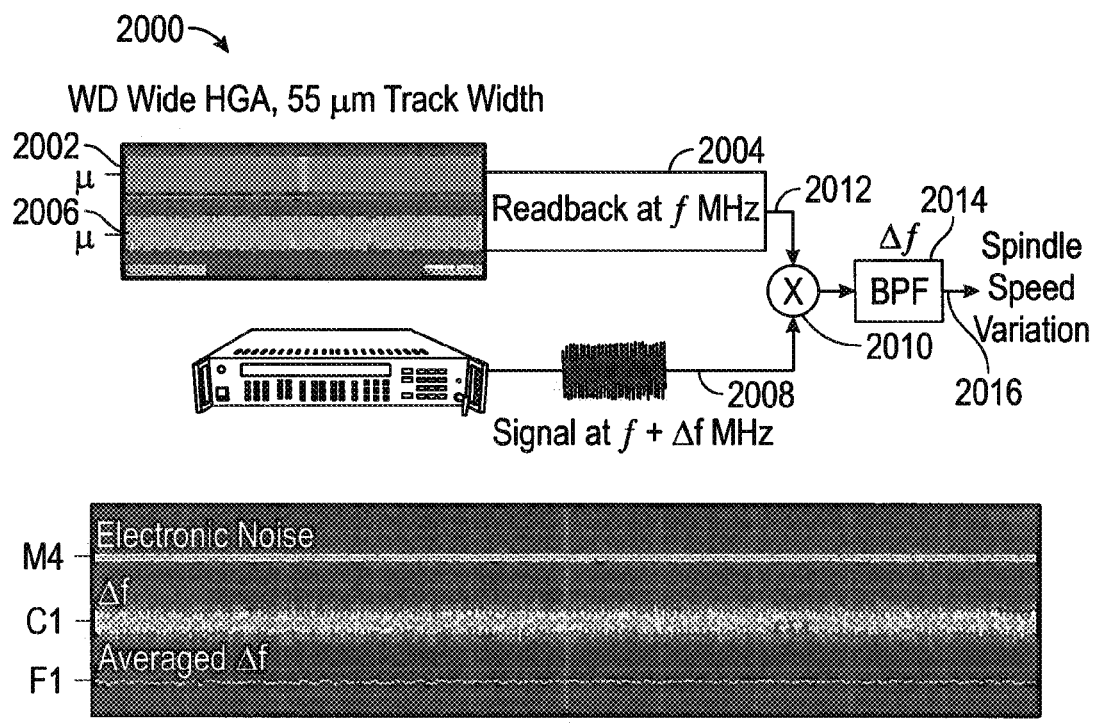
FIG. 20 illustrates a system for real time spindle speed variation and relative head-disk motion measurement in accordance with a present embodiment.
Figure 20:
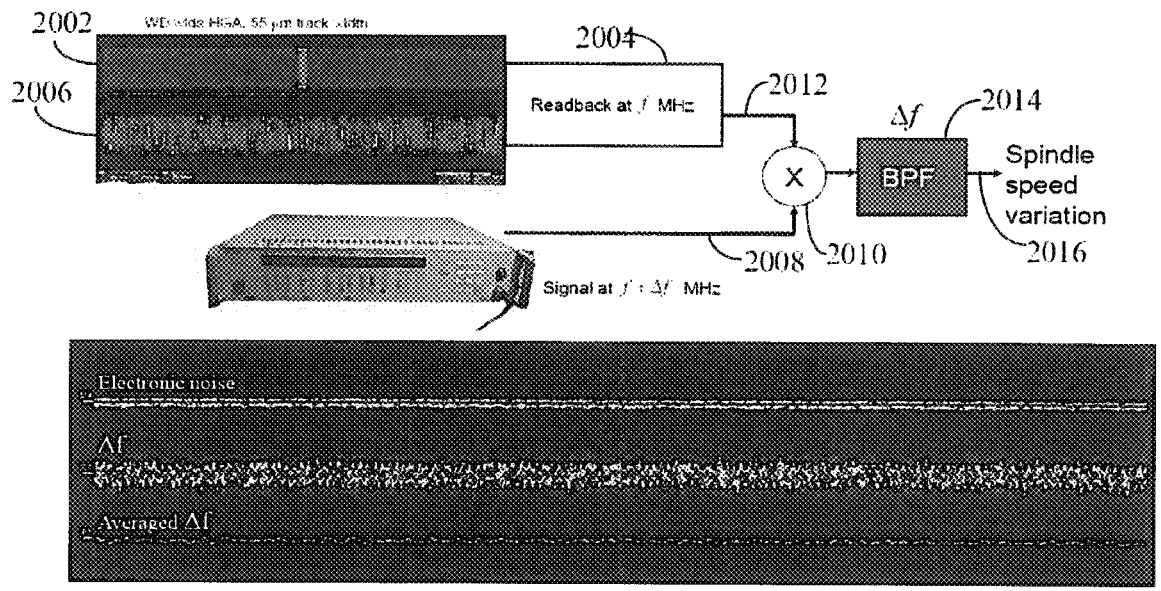

The present embodiment presents a method and approach which can, in addition to measuring the spindle speed and speed variations, also provide measurement for downtrack relative motion and vibration between head and disk at high resolution. Referring to FIG. 20, a diagram 2000 depicts a first approach for real time spindle speed variation and relative head-disk motion measurement. First, a pattern 2002 is written on a track on the disk preferably using a wide writer head. This wide track pattern 2002 will reduce the off-track interference which can degrade a readback signal 2004.

The readback signal 2004 is read back from the wide track pattern 2002 at a frequency f 106. Similar to a rotary encoder scheme, the higher the frequency f 2006 used, the better the resolution. Since the achievable "encoded" resolution is limited only by a bandwidth of the read-write (RW) head and a disk media combination, a very high frequency in the hundreds of megahertz can be used, enabling an approach which is far superior to any conventional rotary encoder scheme. However, in order to strike a balance between signal to noise ratio and resolution, a frequency of around 80 MHz to 150 MHz for current HDDs is preferred.

Subsequently, the RW head is positioned over the written track 2002 and reads back the written track in a continuous fashion. By using a reference clock signal 2008 at frequency f+$\Delta$f, and mixing at a mixer 2010 the reference clock signal 2008 with the readback signal at frequency f 2012, a mixed signal having signal components at a summed frequency 2f+$\Delta$f and a difference frequency $\Delta$f are obtained.

By using a filter 2014 (e.g., a band pass filter (BPF) or narrow band filter) centered at around frequency $\Delta$f, a resulting measurement signal 2016 corresponding to relative spindle speed change and head-disk motion is obtained. It is possible to also use a BPF 2014 that is slightly offset from $\Delta$f depending on the range of relative speed variation to be measured. The width of the filter 2014 passband may also be a necessary parameter of this embodiment. A sharper (smaller passband) filter 2014 will provide a larger signal change (i.e., more sensitive) for the same relative speed change, but may suffer from a limited range of speeds that can be measured. Thus, a good trade-off between the target range of measurement versus sensitivity is desired to achieve optimal results.

The above approach depicted in the diagram 2000 provides very high resolution. However, one drawback of this approach is that the measurement signal generated is not monotonously increasing or decreasing. Since the signal peaks at a center frequency, the measurement may sometimes be ambiguous. This may be especially true when the measurement range spans to the left and right of the peak, as shown in the signal amplitude vs. RPM graphs 2300, 2350 in FIGS. 23B and 23D.

Figure 21:
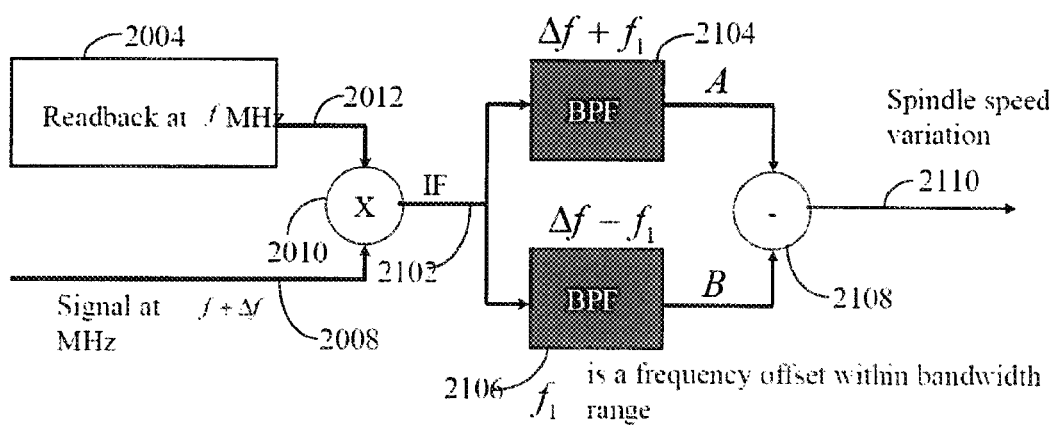
FIG. 21 illustrates a double filter variant of the system of FIG. 20 in accordance with the present embodiment.

A second approach is depicted in diagram 2100 of FIG. 21. This second approach alleviates any ambiguity problem that may be present in the first approach by using two matched filters 2104, 2106 instead of a single filter 2014. The steps to generate the readback signal 2012 are the same as the first approach where a wide track of a single frequency is written and mixed at a mixer 2010 with a reference clock signal 2008 of the same writing frequency. However, this second approach provides the resulting mixed signal IF 202 to the two filters 2104, 2106, wherein the first filter 2104 is centered at $\Delta f + f_1$ and the second filter 2106 is centered at $\Delta f - f_1$, generating the filtered signals A and B, respectively. The frequency $f_1$ is a frequency passband offset within the bandwidth of the first and second bandpass filters 2104, 2106. A normalization procedure such as $(A-B)/(A+B)$ can then be applied by the combiner 2108 to provide a monotonously increasing signal 2110 over the range of relative spindle speeds to be measured.

Figure 22:
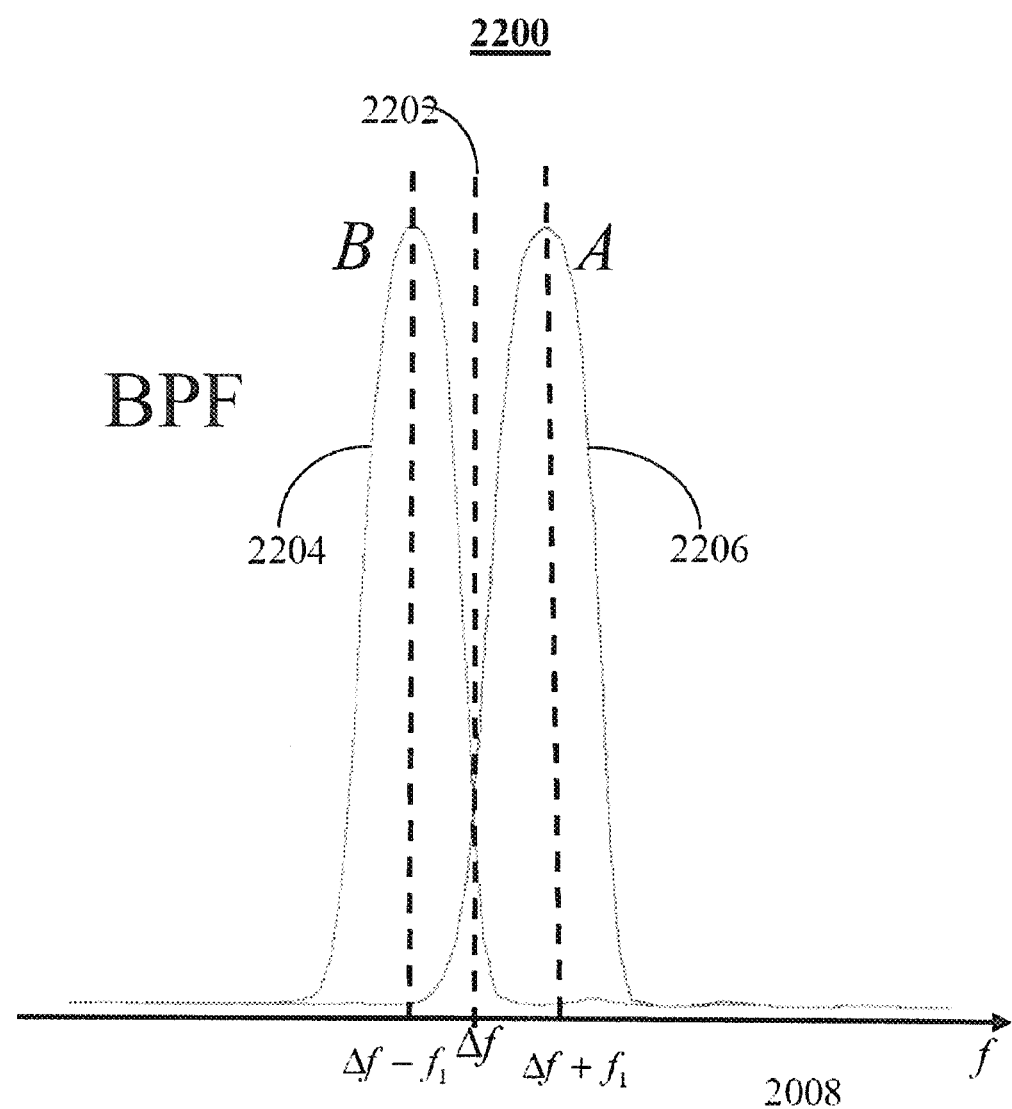
FIG. 22 illustrates a graph of filtered signals of the variant system of FIG. 21 in accordance with the present embodiment.

Referring to FIG. 22, a graph 2200 further illustrates this second approach. When measured signal $\Delta F$ is less than $\Delta f$ 2202, the measured signal $\Delta F$ moves further into the passband of the B signal 2204 and away from the passband of the A signal 2206. If $\Delta F$ is, instead, greater than $\Delta f$ 2202, the measured signal $\Delta F$ moves into the passband of the A signal 2206 and away from the passband of the B signal 2204. Since the signal A 2206 must increase when the signal B 2204 decreases and vice versa, the resulting signal $(A-B)/(A+B)$ is monotonously increasing for the measurement range between $\Delta f + f_1$ and $\Delta f - f_1$, thereby removing the ambiguity. Depending on the measurement range required, appropriate $f_1$ values and filter widths can be chosen for optimal results.

Figure 23C:
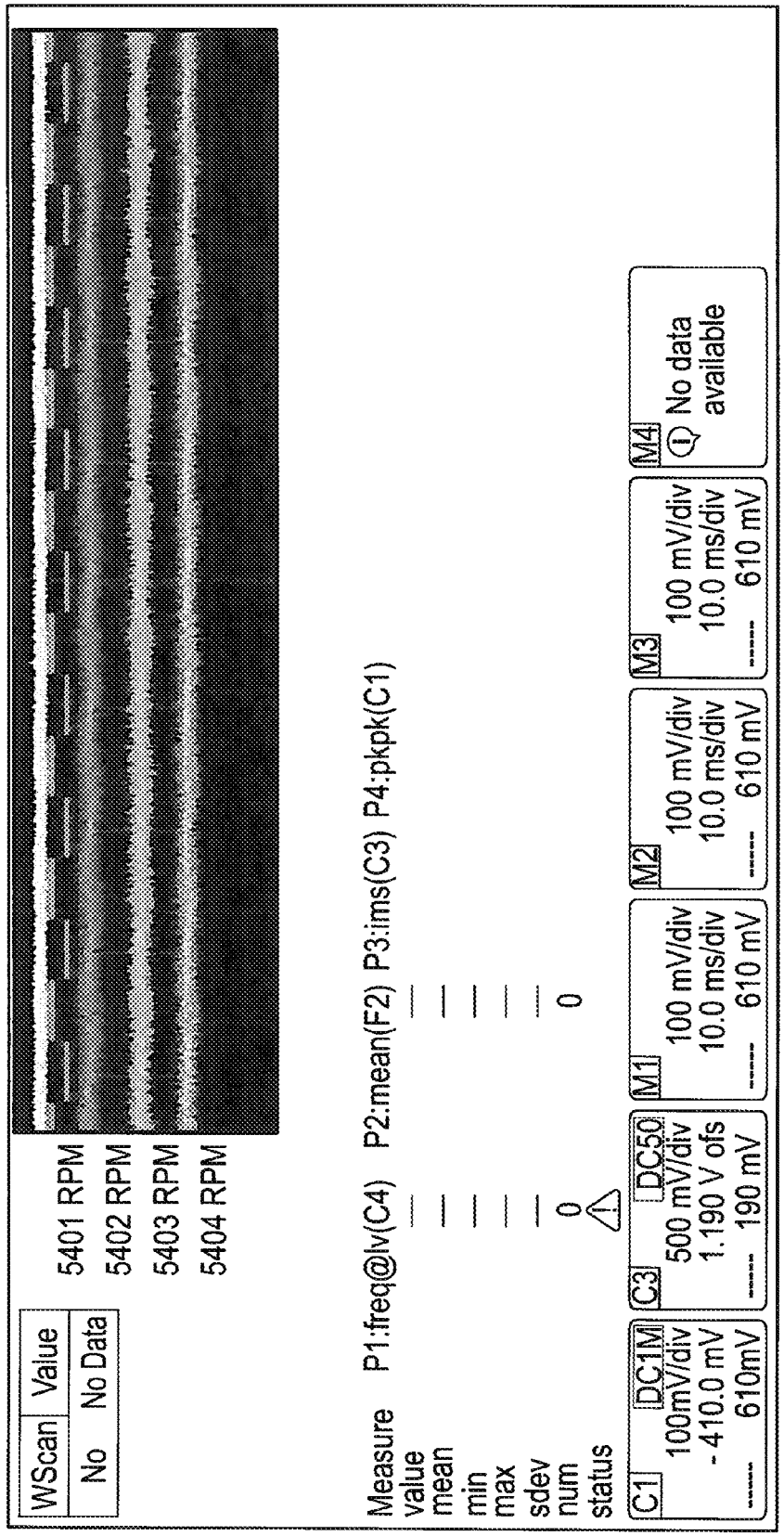
Figure 23D:
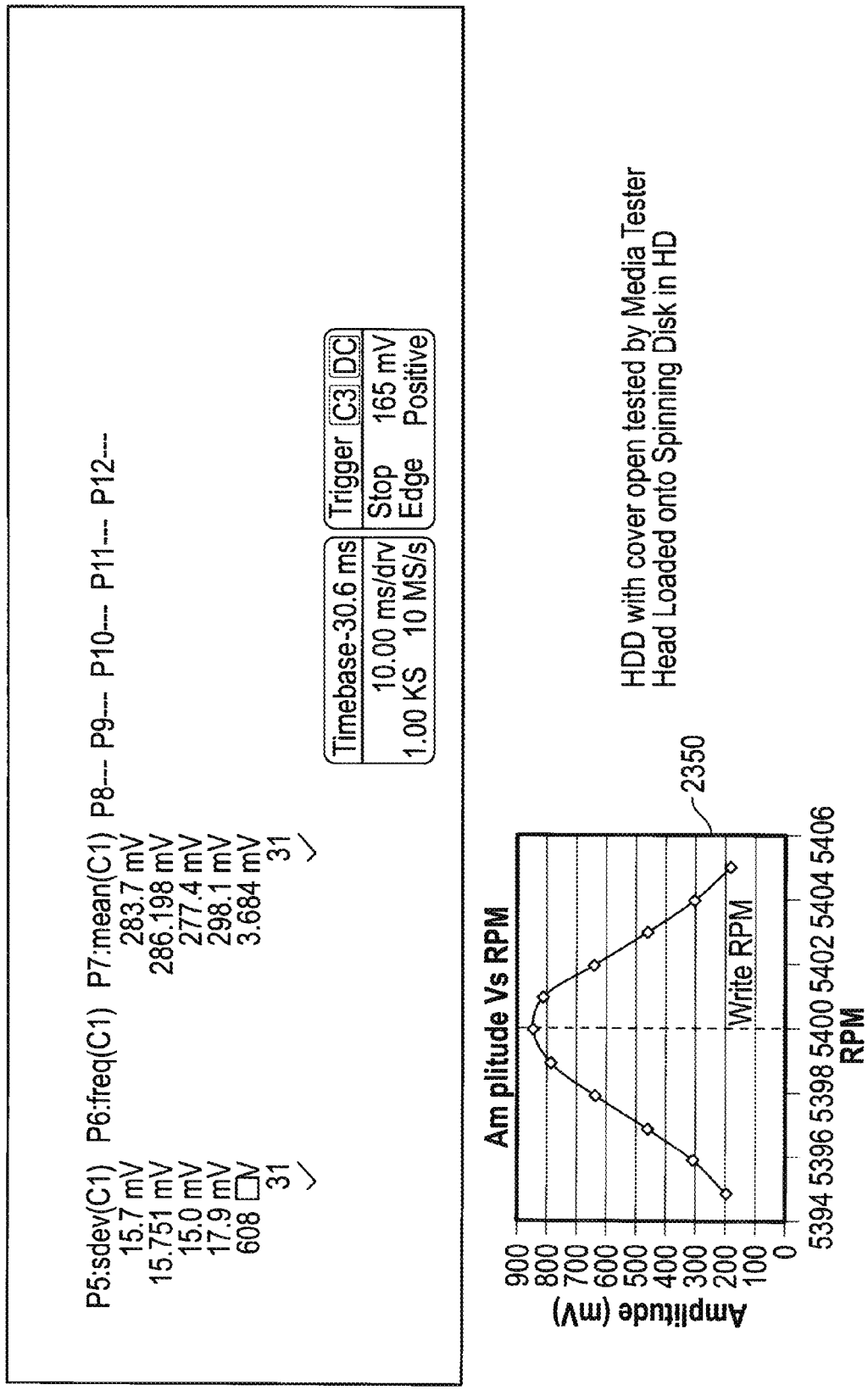
Figure 24A:
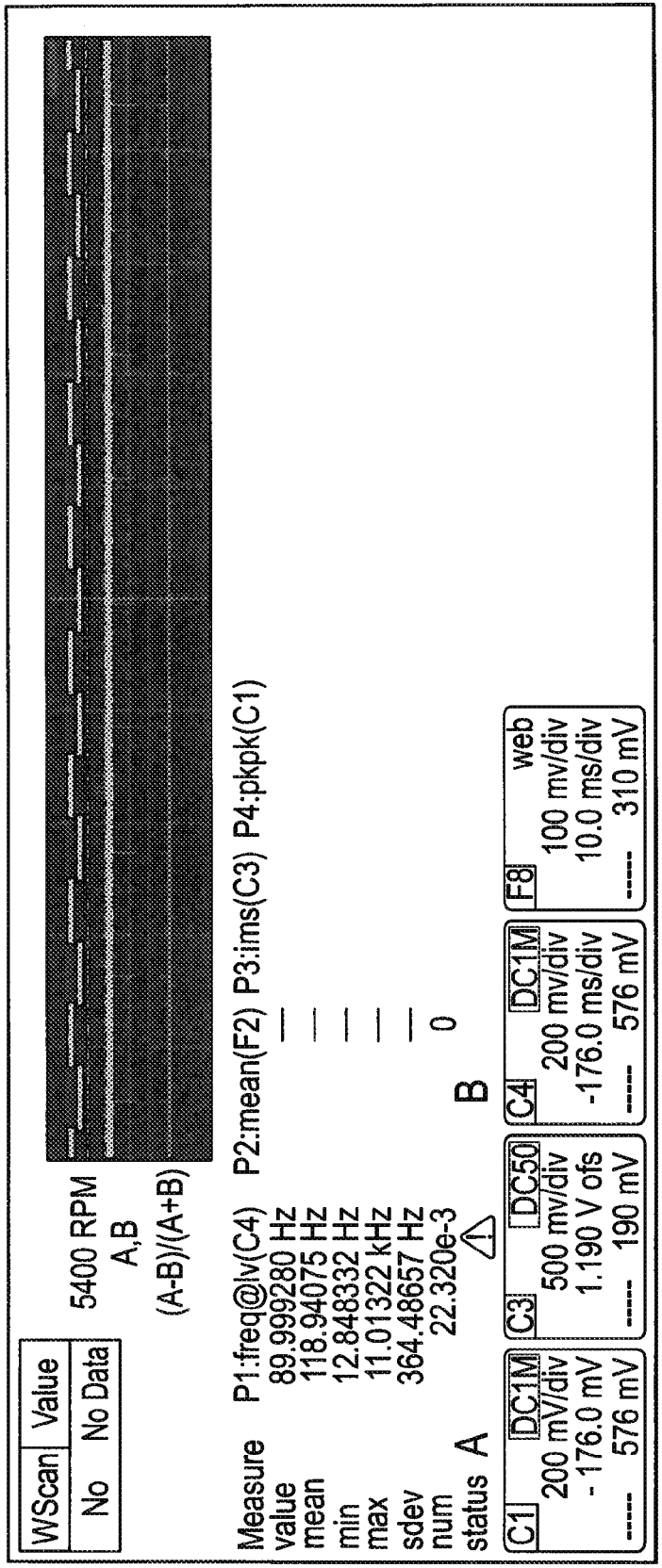
FIGS. 24A and 24B illustrate experimental results obtained using the system of FIG. 21 for measurements on the HDD product of FIGS. 23C and 23D in accordance with the present invention.
Figure 24B:
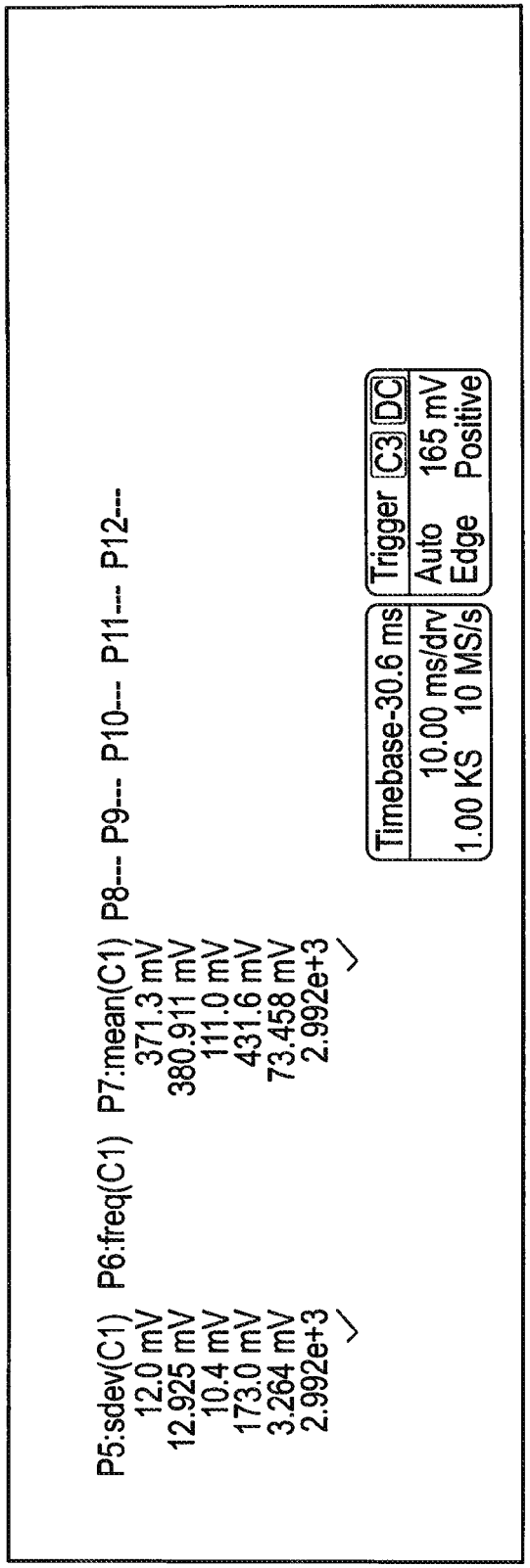

FIG. 23B shows experimental results in the graph 2300 obtained using the first approach for measurements on the air bearing spindle with a measured spindle speed variation of 0.005%. FIG. 23D shows experimental results in the graph 2350 obtained using the first approach for measurements on a HDD product. And FIG. 24B shows experimental results in the graph 2400 when the second approach is used on a HDD product.

The technology and approaches in accordance with the present embodiment can be easily applied to present HDD products. Because no additional components are required except a reference clock and digital filtering, both of which may be easily provided by the HDD system on chip (SOC), large additional costs of implementation are avoided. Also, by implementing the technology into a HDD system and its associated firmware, it is possible to use the technology not only during HDD manufacturing/assembly and in failure analysis situations, but also during normal use by end users.

In the manufacturing and assembly stage, HDD products after assembly could go through a long process of checks including formatting and testing of the media. For very large drives, this could take a long time. Due to manufacturing tolerances and production yields, not all assembled products can work at the same recording density. If the end tested product is found to be unsuitable for a certain recording density, it needs to be downgraded to a lower density level. A test approach in accordance with the present embodiment could be applied, for example, after drive assembly and prior to the formatting and testing step to ascertain the quality of the assembled drive. If at this stage, a drive is found to be of a "lower quality" from measured large speed variations, jitter or relative head-disk vibrations, then the drive can be put to a lower density level immediately. Thus, a simple measurement in accordance with the present embodiment is enabled which could help reduce the manufacturing cost by detecting the quality of the end product earlier without requiring expensive and extensive testing, thereby exemplifying an intelligent manufacturing approach.

The testing approach in accordance with the present embodiment is also useful for the HDD under normal use by end users. For example, it is possible to program the drive for regular self-testing using the testing approach in accordance with the present embodiment. Such self-testing can be performed by the HDD when the drive is idle, thereby serving as a self-reliability check during the HDD's operable life. Any variations in test results can indicate potential drive problems and future failure that need to be fed back to the user for remedial actions before a catastrophic failure actually occurs.

Finally, in a Failure Analysis (FA) situation, the FA process may include running a test in accordance with the present embodiment and examining the test results. A degrade in performance (e.g., increased head-disk vibration or variations in relative spindle speed) could indicate the possible source of a problem to the drive engineer even before a complete teardown is warranted. Thus, the present embodiment can also serve as a quick initial check for the FA process In one aspect of the present invention, a method for monitoring hard disk drive operation in a hard disk drive system including a spindle, a disk and head is provided. The method includes the steps of writing a pattern having a predetermined frequency on a wide track of a hard disk drive medium, generating a readback signal by reading the pattern from the track, processing the readback signal by mixing the readback signal with a reference signal to obtain a summed signal and a difference signal, and filtering the summed signal by a filter centered around the difference signal to generate a measurement signal corresponding to a relative speed change of the spindle and a head-to-disk motion.

The monitoring techniques in accordance with the present embodiment advantageously use written-in information on the disk instead of relying on external sensors such as Hall sensors or rotary encoders, thereby enabling the actual head-disk relative speed and motion to be measured instead of only the spindle speed variation (conventional approaches only measure spindle speed but cannot know relative head-disk vibration). Also, the present embodiment can be implemented in firmware on the HDD and does not require additional components like Hall sensors. Only a frequency source is required, and such frequency source can be provided by the HDD system on chip (SOC). Additionally, the written-in ("encoded") track on the disk media can be at a very high frequency, providing robust, high resolution of measurements, the resolution only being limited by the Read/Write (R/W) capability of the head and media combination. Further, the present embodiment can be used in conjunction with existing spindle speed control schemes in HDD, and can be applied to current HDDs as a means for qualification of HDD components (e.g., the spindle).

As HDD technology moves towards fewer grains/bit recording as well as future configurations such as Two Dimensional Magnetic Recording (TDMR) and bit-patterned media, the need to be able to determine the location of the write and read head versus the location of individual bits becomes very important. Thus, the availability of a synchronization signal to determine these locations is paramount. When utilizing a dual frequency dedicated servo media, where the presence of a dedicated servo magnetic layer allows "always on" servo information, the possibility arises to obtain a "continuously on" write synchronization signal. This "continuously on" signal does not only help with accurate writes on location sensitive media but also provides a means to detect and measure down track and spindle vibration, speed and other conditions.

Figure 25:
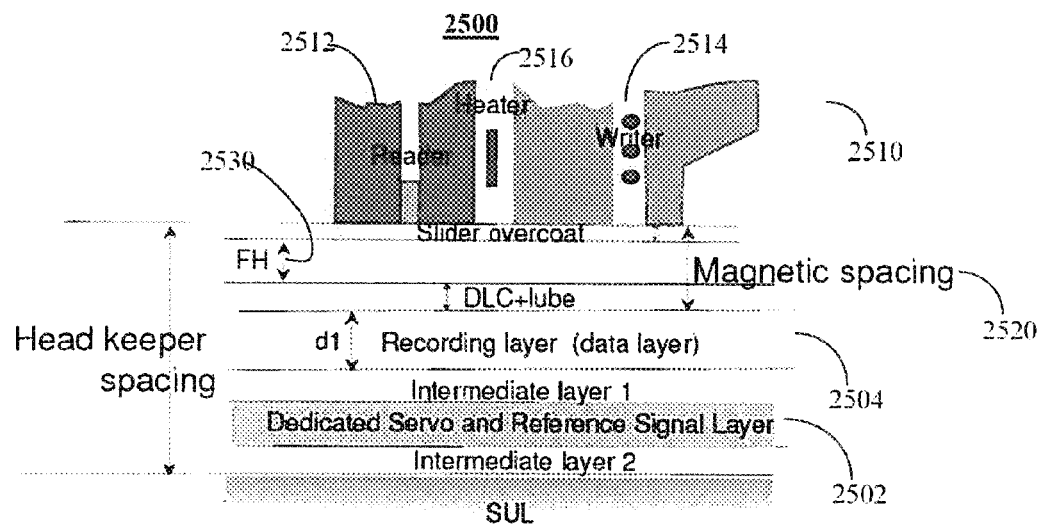
FIG. 25 illustrates a cutaway view of a read-write head over disk media in accordance with the present invention.

In accordance with a second aspect of the present embodiment, a new configuration is proposed to make use of the frequency based dedicated servo signal to produce an always available write synchronization signal that can allow bit location determination, as well as detection of downtrack vibration, spindle speed variation, and jitter. A dedicated servo layer 2502 located below the data magnetic layer 2504 is shown in the cutaway view 2500 in FIG. 25. Multi-frequency or dual frequency based servo schemes can be utilized in the dedicated servo layer 2502. A slider head 2510 includes a reader head 2512 and a writer head 2514 for reading and writing to the magnetic layers 2502 and 2504. The slider head 2510 also includes a heater 2516 for thermal fly height control (TFC) as known to those skilled in the art. It is important to know the vibration, speed variation and jitter information in order to enable synchronized writing.

Figure 26:
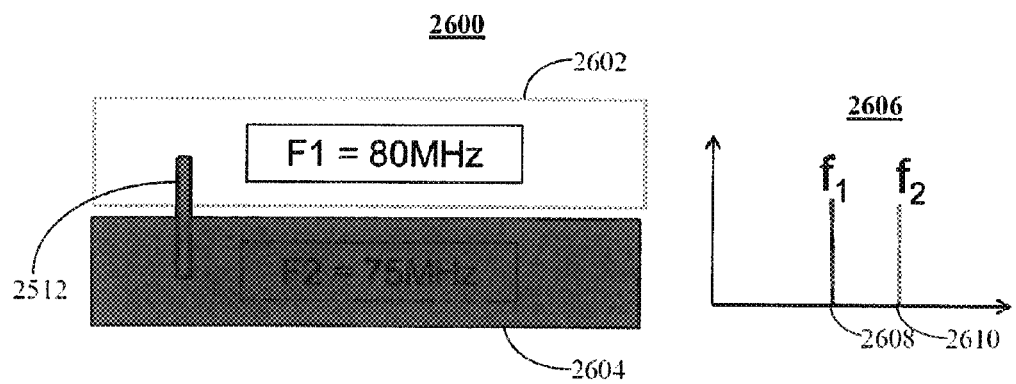
FIG. 26 illustrates a top planar view of the reader head of FIG. 25 superimposed over tracks of a servo layer of the disk media of FIG. 25 in accordance with the present embodiment.

Referring to FIG. 26, a top planar view 2600 shows that the reader head 2512 is positioned at the middle of two tracks 2602, 2604 to read back the superposition of the signals from the two servo tracks 2602, 2604 in the dedicated servo layer 2502. The signals from the two servo tracks 2602, 2604 are two separate frequencies as shown in a graph 2606 (i.e., a frequency F1 2608 and a frequency F2 2610).

Figure 27A:
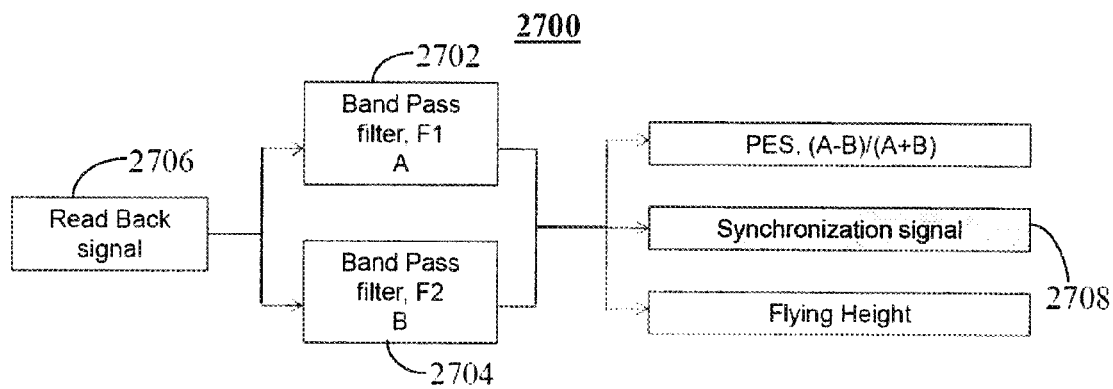
Figure 27B:
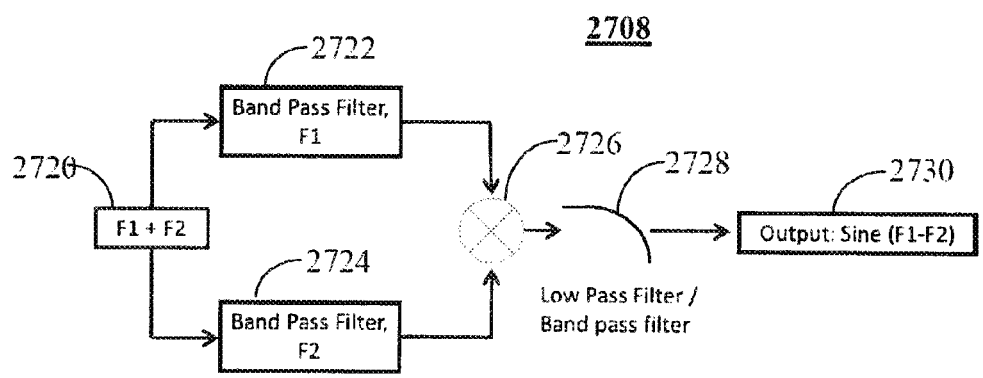

The process to generate the synchronization signal is given in FIG. 27, including FIGS. 27A and 27B. Referring to FIG. 27A, a block diagram 2700 shows that by applying analog filters or digital filters 2702, 2704 centered at F1 and F2 frequencies 2608, 2610, respectively, to the read back signal 2706 respective frequency components can be extracted, namely frequencies A and B corresponding to the signals from servo tracks f1 2602 and f2 2604, respectively. The signals can be further processed to generate a signal 2708 that can be used for write synchronization write synchronization in, for example, Two Dimension Magnetic Recording (TDMR), as well as for the detection of downtrack vibration, spindle speed variation and jitter.

The readback signal 2706 from the dedicated servo system consists of both a data signal and a servo signal. Referring to FIG. 27B, the F1+F2 signal 2720 from the filters 2702, 2704 (FIG. 27A) is processed using filters 2722, 2724 (either analog bandpass or low pass filters or digital filters) to obtain the F1 and F2 components. The separate F1 and F2 signals are then mixed at a mixer 2726 and filtered by a low pass or band pass filter 2728 to generate a Sine (F1−F2) signal 2730 which constitutes the synchronization signal. As the synchronization signal 2730 is obtained entirely from the written-in dedicated servo signals (F1 and F2), no external reference clock or oscillator is required. This means that the synchronization signal 2730 avoids any phase and frequency drift that is common when an external reference clock is used. At the same time, the synchronization signal 2730 will fully reflect downtrack changes in the HDD system such as spindle speed variation and jitter, and relative head-disk vibration in the down track direction.

Figure 28A:
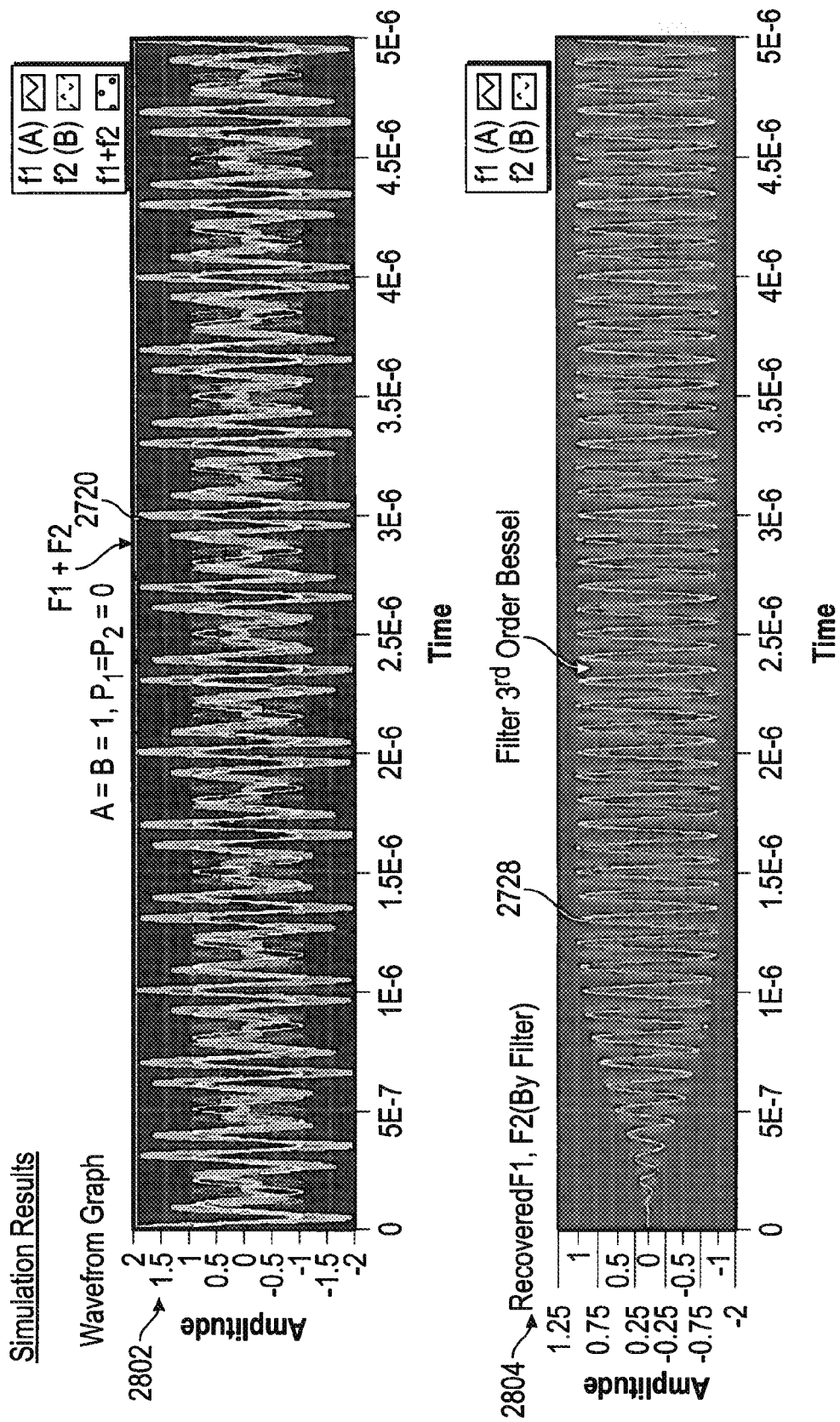
FIGS. 28A and 28B illustrate a first set of simulation results of the synchronization signal processing of FIG. 27B in accordance with the present embodiment.
Figure 28B:
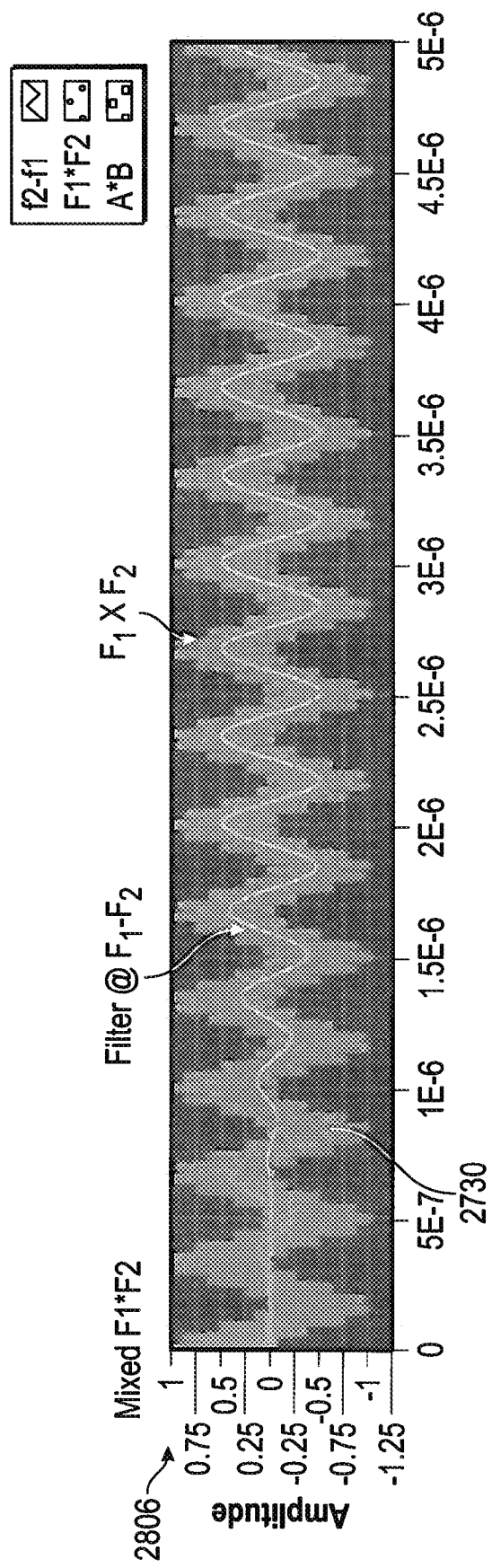
Figure 29:
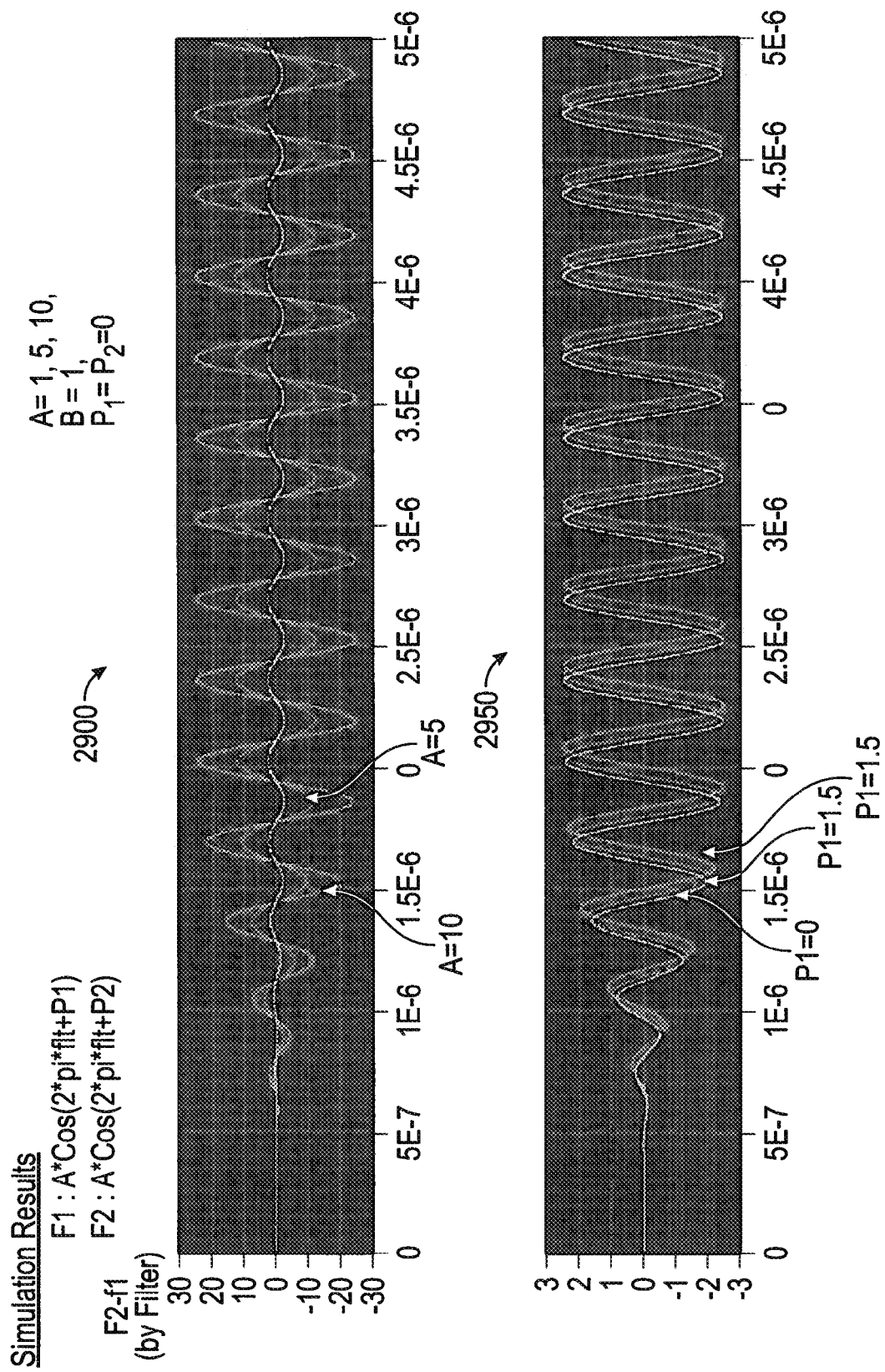
FIG. 29 illustrates a second set of simulation results of the synchronization signal processing of FIG. 27B in accordance with the present embodiment.
Figure 30:
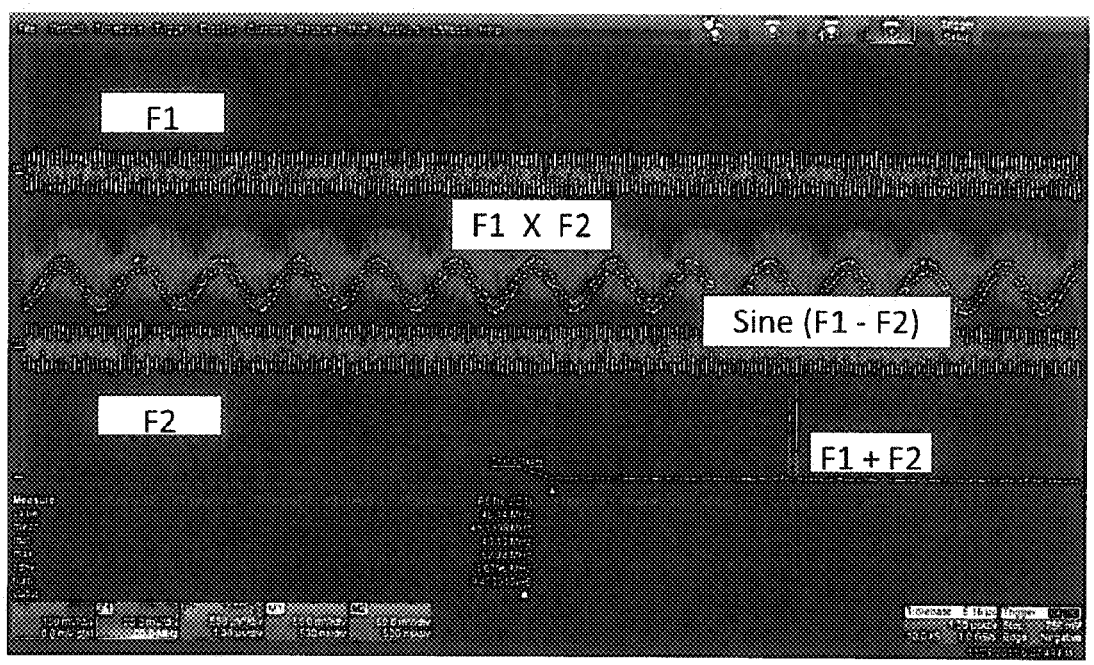
FIG. 30 illustrates spinstand simulation results of the synchronization signal processing of FIG. 27B in accordance with the present embodiment.

FIGS. 28A and B depict three traces 2802, 2804, 2806 that show the simulation results for the generation of the synchronization signal 2730 from the dedicated servo signal. Referring to FIG. 29, simulation results are depicted in a first trace 2900 that illustrates the synchronization signal 2730 is resilient to relative changes in the amplitude of the servo F1 and F2 components which can occur if there is off-track in the read-write head. Essentially by detecting the zero crossing of the AC synchronization signal, effects of off-track which can manifest for example in a different amplitude of the synchronization signal are ignored. A second trace 2950 shows that the synchronization signal 2730 is responsive to a relative phase difference between F1 and F2 components. Referring to FIG. 30, the results 3000 further show the actual spinstand experimental results for generating the synchronization signal 2730, Sine (F1−F2).

The synchronization signal 2730 provides a means to know the location of the read head 2512 in the downtrack direction. For example, the synchronization signal 2730 can be measured and can be translated into a location in the downtrack direction. While a simplified approach counts the number of zero-crossings from the start of a sector or index mark, other methods that can detect phase may also be used. The zero-crossing detector approach is useful because it is not affected by changes in the amplitude of the synchronization signal 2730. By knowing the current location of the read head 2512, it is possible to estimate the location of the write head 2514. With a known location of the write head 2514, synchronized writing utilizing measurements in accordance with the present embodiment can accurately write on targeted magnetic bits.

Figure 31:
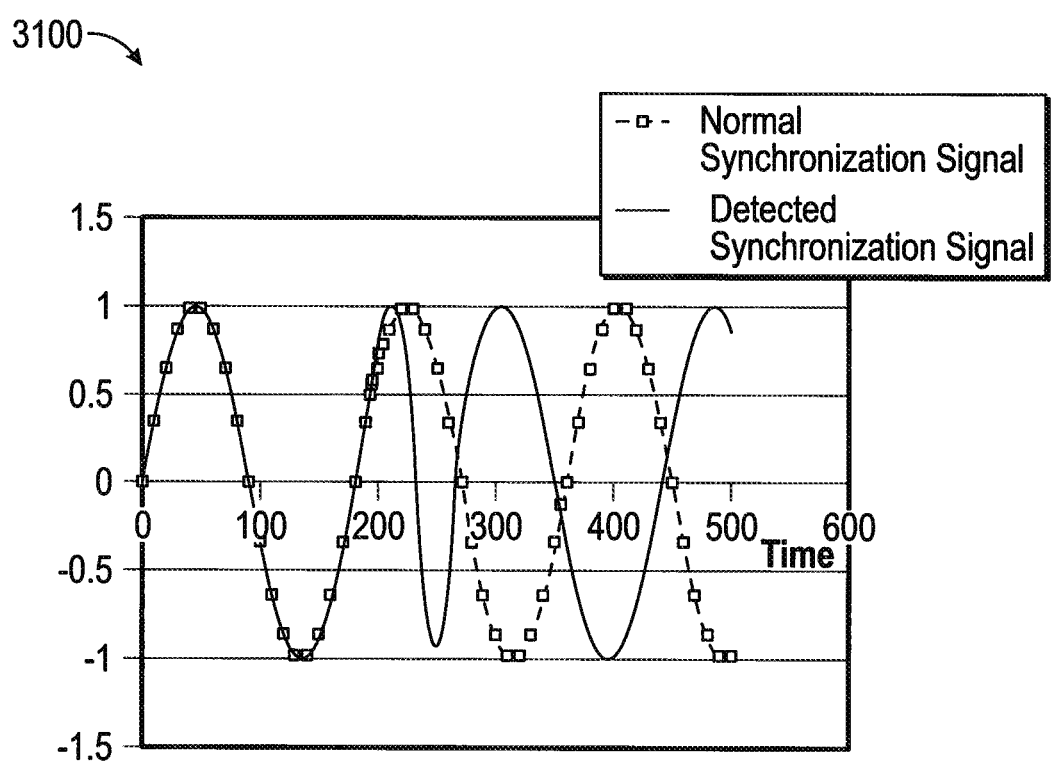
FIG. 31 illustrates a graph of a normal synchronization signal and a detected synchronization signal in a speed increase situation in accordance with the present invention.

In addition to synchronized writing, another advantageous use of the synchronization signal 2730 is that it provides information on relative head-disk motion and captures information including undesired jitter, vibration and shock. For example, a deviation or change to the synchronization signal 2730 at a particular instant of time indicates that there is an event that has caused a disturbance in the downtrack direction. Referring to FIG. 31, a graph 3100 shows an example where relative head-disk speed suddenly increased for a short duration, resulting in a detected synchronization signal 2730 that has deviated from the expected or normal signal. By monitoring the synchronization signal 2730 to detect deviations, ΔSine(F1−F2), it is possible to detect and measure events such as downtrack vibrations or changes in spindle speed.

The ability to monitor downtrack changes and predict downtrack location is advantageous. In the dedicated servo implementation in accordance with the present embodiment, this is even more useful because such monitoring and measurement is available everywhere by virtue of the fact that servo track information is available everywhere on the disk. By implementing the invention into a HDD, for example through firmware in the HDD system on chip (SOC), the monitoring and measurement can become an important tool to detect HDD operational conditions such as excessive shock or vibration and allow the HDD to respond quickly and take preventive action to avoid failure and crash. Regular measurement of the vibration in accordance with the present embodiment can also help to monitor reliability of the drive while in operation. Finally, the present embodiment provides a useful Failure Analysis tool to determine whether the performance of the drive has degraded.

In accordance with this second aspect of the present embodiment, a method for monitoring operation of a hard disk drive system having a disk medium including a buried servo layer having a first frequency of data on a first track and a second frequency of data on a second track, the second track adjacent to the first track, is provided. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal to generate a synchronization signal comprising downtrack information. The downtrack information may include spindle speed variation, spindle speed jitter, and relative head-disk vibration in the downtrack direction.

In accordance with the present embodiment, written-in servo information for phase recovery is used. Thus, no additional information or programming is required. In addition, operation in accordance with the present embodiment does not require an external oscillator, thereby avoiding phase drift between a reference frequency and the written-in servo frequency. Also, operation in accordance with the present embodiment is less affected by jitter and spindle speed variation since the (F1−F2) signal follows spindle jitter and speed variations due to using the written-in servo information for timing. Further, the synchronization signal 2730 is resilient to crosstrack and off-track effects (i.e., the AC zero crossing is unaffected by the relative strength of servo components in the dual frequency servo layer). The changes to the synchronization signal 2730 reflect downtrack spindle jitter or speed variations, as well as relative head-disk vibration and shock. Thus, operation in accordance with the present embodiment can help HDD technology to achieve higher linear bits per inch recording which is required to meet continued areal density growth.

In accordance with another aspect of the present embodiment, a new configuration is proposed to make use of a frequency based dedicated servo signal to produce an always available Flying Height (FH) signal with minimum off-track FH variation. This FH signal can be used as an additional monitoring signal for contact detection and HDD reliability.

With the application of thermal Flying Height control (TFC) technology, the Wallace equation based in-situ FH testing technology becomes the major way to measure the FH of Read/Write (R/W) heads. In theory, one single harmonic is good enough to detect the FH variation. But in actual application, the off-track of a read head changes the amplitude of a readback signal and may be misinterpreted as a change in Flying Height. This is one of the major sources of FH testing error. In order to minimize such FH testing error, a harmonic ratio method is typically preferred. It requires a write-in data pattern that can produce at least two harmonics with harmonic signals of sufficient strength for accurate measurement. However, due to the special write-in pattern required on the media, the FH value is not always available in HDDs. Further, conventional FH measurement techniques currently incorporate an acoustic emission (AE) sensor or contact sensor into the magnetic read/write head of a HDD system to detect the contact point. The additional sensor(s) disadvantageously incur additional component cost for the HDD.

Figure 32:
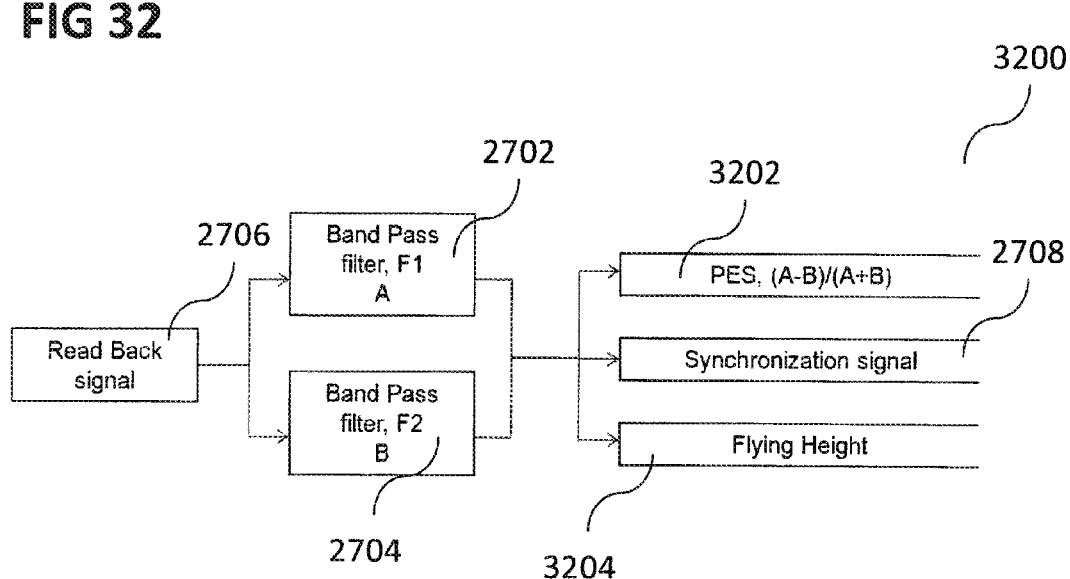
FIG. 32 illustrates a block diagram of position error signal (PES) generation and flying height signal generation in accordance with the present invention.

In accordance with a third aspect of the present embodiment, the dedicated servo layer 2502 in the HDD disk medium is utilized to provide an always available FH signal and advantageously offers minimization of the effects of off-track FH variation. This FH signal can be used as an additional monitoring signal for contact detection and HDD reliability. Referring back to FIG. 25, the dedicated servo layer 2502 is located below the data magnetic layer 2504 in the disk medium. The flying height (FH) 2530 refers to the height of the head 2510 as it flies over the disk medium. Multiple frequencies or a single frequency of data are stored on the servo tracks of the servo layer 2502. The reader 2512 is positioned at the middle of two tracks 2602, 2604 to read back the superposition of the signal as shown in FIG. 26. Referring to the block diagram 3200 of FIG. 32, by applying analog or digital filters 2702, 2704, the signal for the respective frequency components can be extracted from the readback signal 2706, and the amplitude of the signals, namely A and B can be determined. The amplitude of the signals can be further processed to produce a position error signal (PES) 3202, the synchronization signal 2708 and a flying height signal 3204.

Based on the Wallace Spacing Loss equation, the spacing Loss is expressed as:

$$A = e^{-2\pi d/\lambda} \quad (8)$$

where λ is the wavelength of the written data pattern and d is the relative change in spacing. Based on the amplitude ratio of the Wallace equation, we can use five different Wallace spacing methods (obtained from equation (8)) to calculate FH from the simultaneous two frequency servo signal. They are:

$$\Delta d = -\frac{\Delta \ln(A) * \lambda_A}{2\pi} \quad (9)$$

$$\Delta d = -\frac{\Delta \ln(B) * \lambda_B}{2\pi} \quad (10)$$

$$\Delta d = -\frac{\Delta \ln(AB)}{2\pi}\left[\frac{\lambda_A \lambda_B}{\lambda_B + \lambda_A}\right] \quad (11)$$

$$\Delta d = -\frac{\Delta \ln(A/B)}{2\pi}\left[\frac{\lambda_A \lambda_B}{\lambda_B - \lambda_A}\right] \quad (12)$$

$$\ln(A+B) = \ln\left[e^{-\frac{2\pi d}{\lambda_A}} + e^{-\frac{2\pi d}{\lambda_B}}\right] \quad (13)$$

Figure 33:
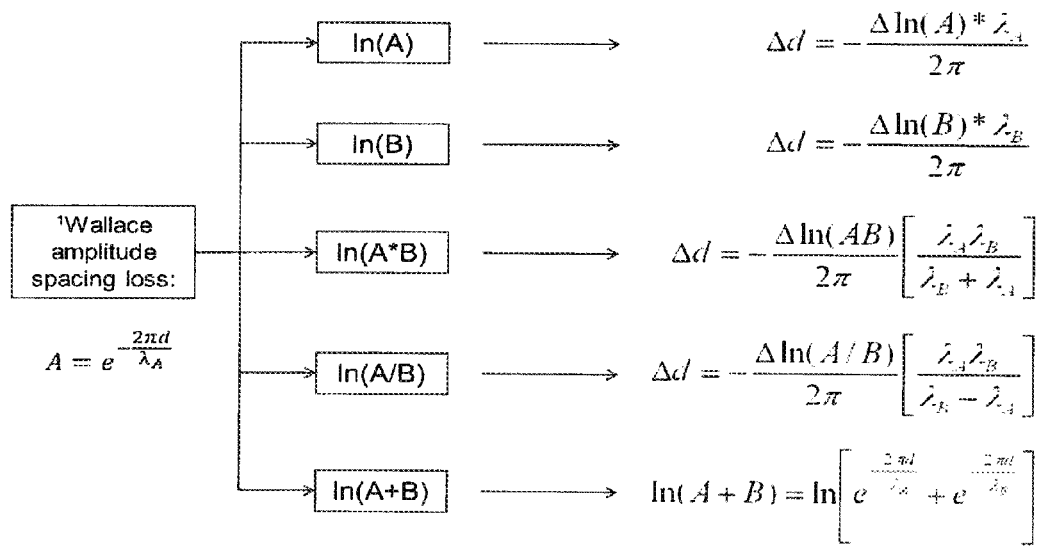
FIG. 33 illustrates Wallace equation generation in accordance with the present embodiment.

The above equations are based on ln(A), ln(B), ln(A*B), ln(A/B) and ln(A+B). The respective equations are shown in FIG. 33. It is straightforward to calculate FH based on the first four equations. However, for the case ln(A+B), a more complex equation is needed to calculate FH and d needs to be calculated from a trial and error or iterative approach.

Alternatively, a simple calibration approach can be taken to determine the FH instead of solving the complex equation (13). In this case, we use the ln(A*B) case to calibrate FH for ln(A+B). The calibration equation is shown below:

$$\Delta d = \frac{\Delta \ln(A+B)}{\Delta \ln(A+B)_x} \times \Delta d_x \quad (14)$$

where x is the relative TFC applied and $\Delta d_x$ is the corresponding relative FH measured by $\Delta \ln(A*B)_x$. By normalizing the $\Delta \ln(A+B)$ against $\Delta \ln(A+B)_x$, the FH can be deduced.

Figure 34A:
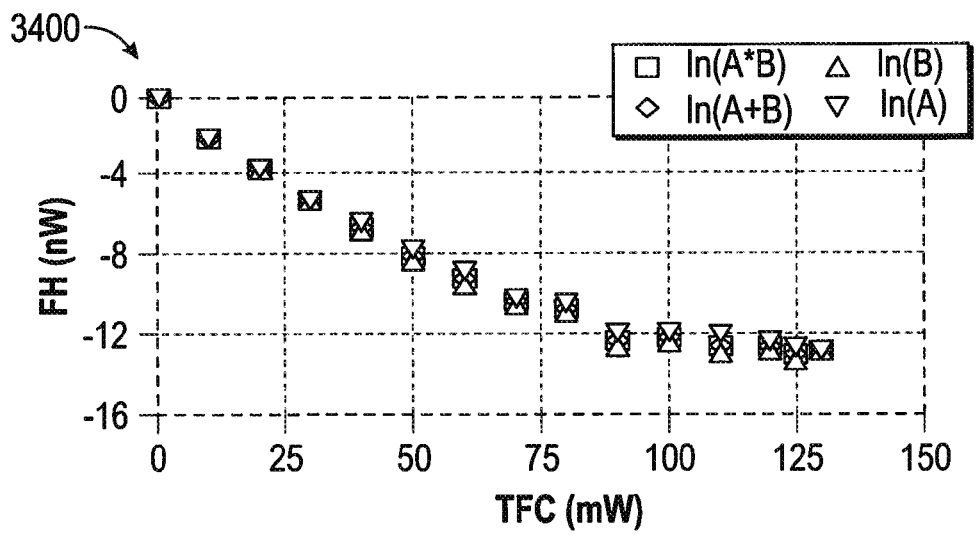
Figure 34B:
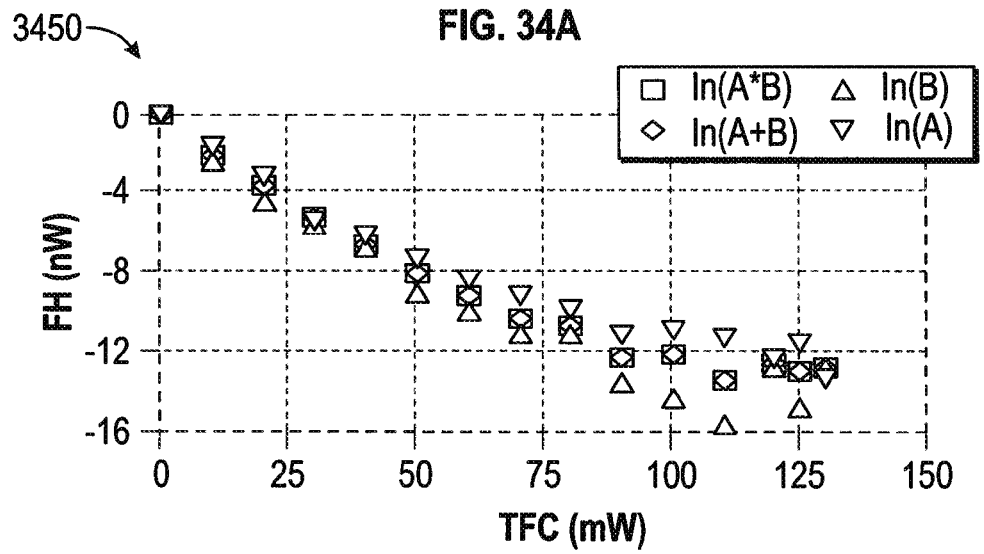
Figure 35:
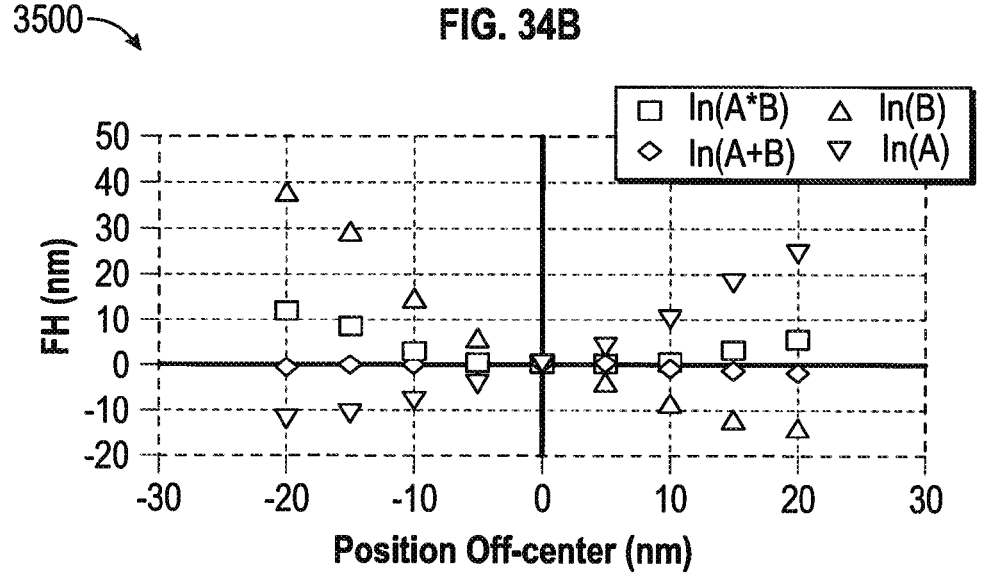
FIG. 35 illustrates a graph of experimental results for off-track variations of the flying height signal measured in accordance with the present embodiment.

FIG. 34, including FIGS. 34A and 34B, shows the touch down curve for respective methods of FH measurement. A graph 3400 in FIG. 34A shows the FH measurement after one hundred times averaging, while a graph 3450 in FIG. 34B indicates an arbitrary instantaneous one point FH measurement. The information depicted in the graph 3450 shows that the FH measured by a single frequency is greatly affected by off-track error. This is further confirmed by the experimental results shown in a graph 3500 of FIG. 35. For these results, the TFC was fixed. It can be seen that the off-track FH variation error can be systematically studied by moving the reader sensor from −20 nm off-center to +20 nm off-center. However, ln(A+B) shows very little off-track FH variation error.

Figure 37:
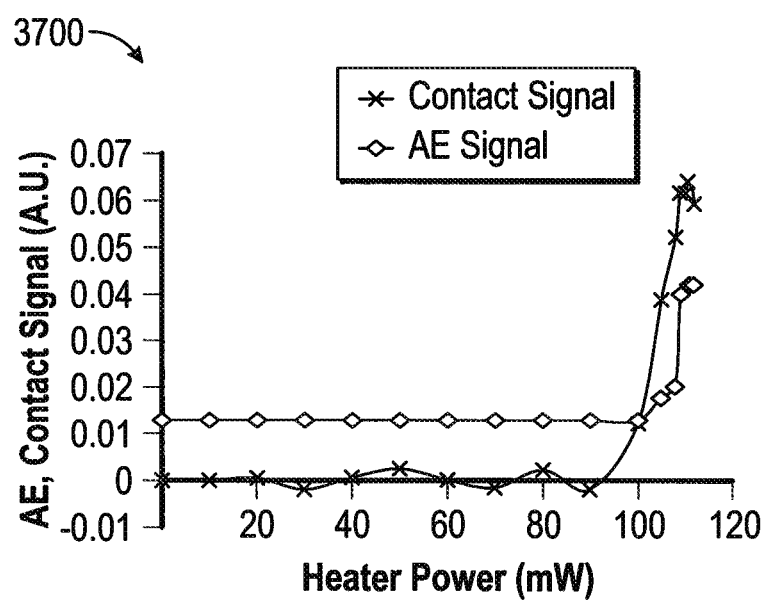
FIG. 37 illustrates a graph of a change in the flying height signal from thermal flying height control (TFC) actuation at different altitudes in accordance with the present embodiment.
Figure 37:
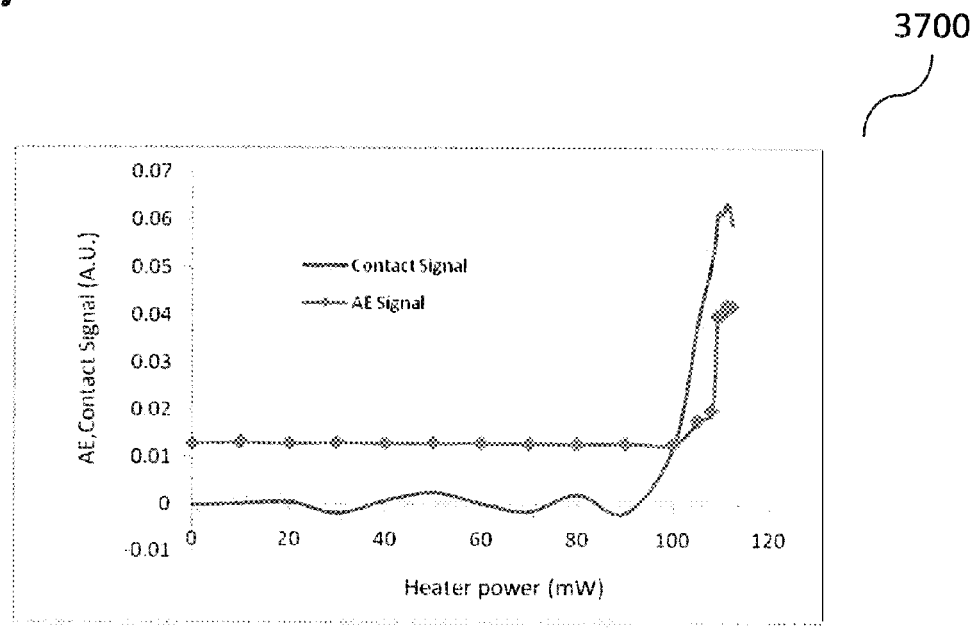

The instantaneous and always available FH signal can also be used as the contact detection sensor. FIG. 36A shows the time domain FH signal. In FIG. 36A, a graph 3600 shows FH signals 3605 and 3615 at different TFC powers. The FH signal 3615 shows a FH signal during normal operation while the vibration FH signal 3605 is clearly observed during the head disk contact at a higher TFC power. FIG. 36B depicts a graph 2620 which plots the root mean square (RMS) of the FH signal at different TFC powers where signals 3622, 3624, 3626 are obtained using ln(A), ln(B) and ln(A+B), respectively. In the graph 2620, the RMS measurements depict a clear sudden increase of value at contact TFC. In some cases, the FH's RMS can even detect the FH vibration prior the AE sensor as shown in a graph 3700 of FIG. 37. This early detection can be attributed to pre-contact slider vibration. All of the above-mentioned FH measurement methods can be used as contact detection. Together with the continuous PES signal 3202, these give a two dimensional and fast response to near contact condition.

Figure 38:
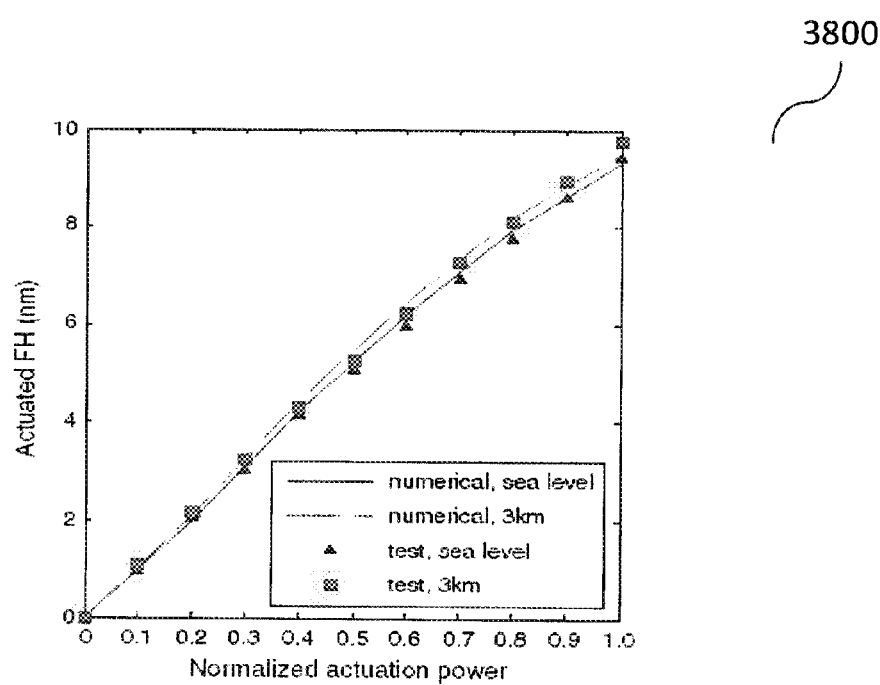
FIG. 38 illustrates a conventional graph of the curve of flying height versus TFC actuation as it varies at different altitudes.

As the FH versus TFC actuation curve is different at different altitudes (as shown in a prior art example in graph 3800 of FIG. 38), it is possible to create different FH calibration curves for different altitudes. One way is to calibrate and obtain curves under different air pressures corresponding to the different altitudes.

Subsequently, in actual HDD operation, by moving the operating point through changing the TFC actuation (without going to contact) and measuring the change in FH for each TFC power used, it is possible to determine the gradient, $\Delta FH/\Delta Power_{TFC}$. This parameter can be used to determine on which altitude curve the drive is operating. If the altitude curve is correctly determined, then appropriate FH look-up tables could be used and unnecessary and undesired head disk contact could be avoided by being able to apply the appropriate TFC power for different altitudes.

The ability to determine the altitude curve on which the drive is working is of great value. In present HDDs, it is difficult to incorporate an altitude sensor. Although drives have temperature sensors (e.g., thermistors), they generally do not have altitude sensors. This means that current HDDs do not know whether they are being operated at a high altitude (e.g., greater than twenty thousand feet) or at sea level. When at a high altitude, the flying height of the head is lower and there is increased chance of head-disk contact and reliability issues if an improper TFC power (such as that suitable for sea level use) is applied.

Appropriate look-up tables for HDD operation under different conditions of pressure (altitude) and temperature can be generated by operation in accordance with the present embodiment. Once these tables are generated, it is possible in accordance with the present embodiment to identify the right look up table to be used in actual drive operation, thus reducing the reliability problems associated with HDD usage at different altitudes. Without calibrated look-up tables for different altitudes, the common approach for current HDDs is to spin down the disk or adjust the TFC such that the head/slider comes into intermittent contact with the disk. Once this is done, the flying height is then known from the amount of TFC actuation applied. However, this touch down approach may wear out the RW heads and also has the risk of head disk damage. Therefore, reduction or elimination of the need to touch down the RW head is enabled by the present embodiment.

Another important advantage of the present embodiment is that the FH information is always available since the servo information is available everywhere for the dedicated servo HDD. Compared to current drives where FH measurement can only depend on a few designated and specially written areas on the disk (if readback signal approach to determine FH is used), the always available FH information for the dedicated servo disk comes at little cost, but brings about great benefits.

In accordance with one aspect of the present invention, a method for measuring flying height of a head over a disk medium in a hard disk drive (HDD) system having a disk medium including a buried servo layer having a first frequency of data on a first track and a second frequency of data on a second track, the second track adjacent to the first track, is provided. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal using Wallace equations to generate a synchronization signal comprising flying height information. A second aspect includes developing a table of operational parameters for various pressures and temperatures from the flying height information for improved HDD system operation.

Thus it can be seen that methods for hard disk drive system operation have been disclosed which provides many advantages over the drawbacks of conventional HDDs. While several exemplary embodiments have been presented in the foregoing detailed description of the invention, it should be appreciated that a vast number of variations exist, including variations as to the materials, structure and operation of the data storage device.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of play steps described in an exemplary embodiment without departing from the scope of the invention as set forth herein.

According to various embodiments, a method for monitoring hard disk drive operation in a hard disk drive system including a disk having a hard disk medium on a surface thereof and being rotated by a spindle coupled thereto, the hard disk drive system further including a head for writing to and reading from the hard disk medium, may be provided. The method may include: writing a wide track pattern having a predetermined frequency on the hard disk drive medium; generating a readback signal by reading the wide track pattern; processing the readback signal by mixing the readback signal with a reference signal to obtain a mixed signal including a summed signal and a difference signal; and filtering the mixed signal by a filter having parameters determined in response to the difference signal to generate a measurement signal corresponding to a relative speed change of the spindle and a head-to-disk motion.

According to various embodiments, the filtering step may include or may be filtering the mixed signal by a filter centered around the difference signal to generate the measurement signal.

According to various embodiments, the filtering step may include or may be filtering the mixed signal by a filter slightly offset from the difference signal to generate the measurement signal.

According to various embodiments, the generating the readback signal step may include or may be generating the readback signal by reading the wide pattern from the track at a predetermined frequency f.

According to various embodiments, the predetermined frequency f may be a predetermined frequency greater than 50 MHz.

According to various embodiments, the predetermined frequency f may be a predetermined frequency in the range of 80 MHz to 150 MHz.

According to various embodiments, the processing the readback signal step may include or may be processing the readback signal by mixing the readback signal with the reference signal to obtain the mixed signal including the summed signal and the difference signal and wherein the reference signal comprises the predetermined frequency f plus the difference signal.

According to various embodiments, the filtering step may include or may be: filtering the mixed signal by a first bandpass filter having parameters determined in response to the difference signal to obtain a first filtered signal; filtering the mixed signal by a second bandpass filter having parameters determined in response to the difference signal to obtain a second filtered signal; and combining the first filtered signal and the second filtered signal to generate the measurement signal corresponding to the relative speed change of the spindle and the head-to-disk motion.

According to various embodiments, the first bandpass filter and the second bandpass filter may have equivalent bandwidths and wherein the first bandpass filter and the second bandpass filter have non-bandwidth parameters determined in response to the difference signal and a frequency passband offset f1 within the bandwidth of the first and second bandpass filters.

According to various embodiments, the first bandpass filter may have non-bandwidth parameters determined in response to a sum of the difference signal and the frequency passband offset f1 and wherein the second bandpass filter has non-bandwidth parameters determined in response to a difference between the difference signal and the frequency passband offset f1.

According to various embodiments, a method for monitoring operation of a hard disk drive system having a disk medium including a buried servo layer having a first frequency of data on a first track and a second frequency of data on a second track, the second track adjacent to the first track, may be provided. The method may include: reading a readback signal by a head positioned at the middle of the first track and the second track; filtering the signal by a first filter centered at the first frequency to extract a first component signal; filtering the signal by a second filter centered at the second frequency to extract a second component signal; and combining the first component signal and the second component signal to generate a synchronization signal comprising downtrack information.

According to various embodiments, the method may further include the step of utilizing the synchronization signal for write synchronization in Two Dimension Magnetic Recording (TDMR).

According to various embodiments, the downtrack information may include or may be one or more of spindle speed variation information, spindle speed jitter information, and relative head-disk vibration in the downtrack direction information.

According to various embodiments, the data on the first and second tracks may include or may be written-in servo information for phase recovery.

According to various embodiments, a method for measuring flying height of a head over a disk medium in a hard disk drive (HDD) system, wherein the disk medium includes a buried servo layer having a first frequency of data on a first track and a second frequency of data on a second track, the second track adjacent to the first track, may be provided. The method may include: reading a readback signal by a head positioned at the middle of the first track and the second track; filtering the signal by a first filter centered at the first frequency to extract a first component signal; filtering the signal by a second filter centered at the second frequency to extract a second component signal; and combining an amplitude of the first component signal and an amplitude of the second component signal using Wallace equations to generate a synchronization signal comprising flying height information.

According to various embodiments, the method may further include: developing a table of operational parameters for various pressures and temperatures from the flying height information; and utilizing the table of operational parameters for HDD system operation.

Methods and architecture for monitoring hard disk drive operation is provided. The hard disk drive system provided includes a spindle, a head and a disk with a disk medium including a buried servo layer having a first frequency of data on a first track and a second frequency of data on a second track, the second track adjacent to the first track. The method includes the steps of writing a wide track pattern having a predetermined frequency on a track of a hard disk drive medium, generating a readback signal by reading the pattern from the track, processing the readback signal by mixing the readback signal with a reference signal to obtain a mixed signal having a summed signal and a difference signal, and filtering the mixed signal by a filter centered around the difference signal to generate a measurement signal corresponding to a relative speed change of the spindle and a head-to-disk motion. In addition, filtering a readback signal generated by the head when positioned at the middle of the first track and the second track with a first filter centered at the first frequency and a second filter centered at the second frequency is used to generate a synchronization signal for determining spindle speed variation, spindle speed jitter, and relative head-disk vibration in the downtrack direction, for synchronizing writing in Two Dimensional Magnetic Recording (TDMR) and for measuring continuous flying height information based on Wallace equations.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for reading data from a storage medium using a reader, the method comprising:
   reading a first signal with a reader head of the reader at a first position of the storage medium, wherein the first signal includes a first portion corresponding to a first track and a second portion corresponding to a second track;

reading a second signal with the reader head of the reader at a second position of the storage medium, wherein the second signal includes a third portion corresponding to the first track and a fourth portion corresponding to the second track;

estimating, based on the first portion and the second portion, (i) a first ratio of an amplitude of the first signal contributed by the first track with the reader head of the reader at the first position and (ii) a second ratio of the amplitude of the first signal contributed by the second track with the reader head of the reader at the first position;

estimating, based on the third portion and the fourth portion, (i) a third ratio of the amplitude of the second signal contributed by the first track with the reader head of the reader at the second position and (ii) a fourth ratio of the amplitude of the second signal contributed by the second track with the reader head of the reader at the second position; and determining data stored at a pre-determined position of the storage medium based on the estimated first ratio, the estimated second ratio, the estimated third ratio, and the estimated fourth ratio, wherein the storage medium comprises a plurality of tracks including the first track and the second track, each track having a width smaller than a width of the reader head of the reader.

2. The method of claim 1,
wherein for at least one of the first position or the second position the reader head of the reader covers the first track and the second track.

3. The method of claim 2,
wherein the pre-determined position comprises one of a pre-determined position on the first track or a pre-determined position on the second track.

4. The method of claim 2, wherein:
the first track is adjacent to the second track.

5. The method of claim 1, further comprising:
reading a plurality of signals, wherein for each signal the reader head of the reader is at a different position of the storage medium; and
determining data stored at the pre-determined position of the storage medium based on the plurality of signals.

6. The method of claim 1, further comprising:
reading a frequency burst signal with the reader head of the reader at a position of the storage medium comprising a frequency burst provided before a data track written at the same time when data is written on the storage medium;
wherein determining the data stored at the pre-determined position both down track and cross track of the storage medium is further based on the frequency burst signal.

7. The method of claim 1, wherein:
the storage medium comprises a plurality of tracks having a width smaller than a width of the reader head of the reader; and
the storage medium comprises at least one track having a width equal to or larger than the width of the reader head of the reader.

8. The method of claim 1, wherein:
determining the data stored at the pre-determined position of the storage medium includes determining a phase offset of data stored at the second position of the recording medium.

9. A storage device comprising:
a storage medium;
a reader configured to (i) read a first signal with a reader head of the reader at a first position of the storage medium, wherein the first signal includes a first portion corresponding to a first track and a second portion corresponding to a second track, and (ii) read a second signal with the reader head of the reader at a second position of the storage medium, wherein the second signal includes a third portion corresponding to the first track and a fourth portion corresponding to the second track; and
a data determination circuit configured to
estimate, based on the first portion and the second portion, (i) a first ratio of an amplitude of the first signal contributed by the first track with the reader head of the reader at the first position and (ii) a second ratio of the amplitude of the first signal contributed by the second track with the reader head of the reader at the first position,
estimate, based on the third portion and the fourth portion, (i) a third ratio of the amplitude of the second signal contributed by the first track with the reader head of the reader at the second position and (ii) a fourth ratio of the amplitude of the second signal contributed by the second track with the reader head of the reader at the second position, and
determine data stored at a pre-determined position of the storage medium based on the estimated first ratio, the estimated second ratio, the estimated third ratio, and the estimated fourth ratio,
wherein the storage medium comprises a plurality of tracks including the first track and the second track, each track having a width smaller than a width of the reader head of the reader.

10. The storage device of claim 9, wherein:
for at least one of the first position or the second position the reader head of the reader covers the first track and the second track.

11. The storage device of claim 10, wherein:
the pre-determined position comprises one of a pre-determined position on the first track or a pre-determined position on the second track.

12. The storage device of claim 10, wherein:
the first track is adjacent to the second track.

13. The storage device of claim 9, wherein:
the reader is further configured to read a plurality of signals, wherein for each signal the reader head of the reader is at a different position of the storage medium; and
the determination circuit is further configured to determine data stored at the predetermined position of the storage medium based on the plurality of signals.

14. The storage device of claim 9, wherein:
the reader is further configured to read a frequency burst signal with the reader head of the reader at a position of the storage medium comprising a frequency burst provided before a data track on the storage medium; and
the determination circuit is further configured to determine the data stored at the pre-determined position of the storage medium further based on the frequency burst signal.

15. The storage device of claim 9, wherein:
the storage medium comprises a plurality of tracks having a width smaller than a width of the reader head of the reader; and the storage medium comprises at least one track having a width equal to or larger than the width of the reader head of the reader.

16. The storage device of claim 9, wherein:

the determination circuit is further configured to determine the data stored at the pre-determined position of the storage medium further based on determining a phase offset of data stored at the second position of the storage medium.

\* \* \* \* \*